(12) United States Patent
Wilder et al.

(10) Patent No.: US 8,443,170 B2
(45) Date of Patent: May 14, 2013

(54) APPARATUS AND METHOD FOR PERFORMING SIMD MULTIPLY-ACCUMULATE OPERATIONS

(75) Inventors: Mladen Wilder, Cambridge (GB); Dominic Hugo Symes, Cambridge (GB); Richard Edward Bruce, Tai Po (HK)

(73) Assignee: ARM Limited, Cambridge (GB)

(*) Notice: Subject to any disclaimer, the term of this patent is extended or adjusted under 35 U.S.C. 154(b) by 909 days.

(21) Appl. No.: 12/585,573

(22) Filed: Sep. 17, 2009

(65) Prior Publication Data

US 2010/0274990 A1     Oct. 28, 2010

(30) Foreign Application Priority Data

Oct. 8, 2008   (GB) .................................. 0818491.3
Sep. 1, 2009   (GB) .................................. 0915208.3

(51) Int. Cl.
*G06F 15/00* (2006.01)
*G06F 15/76* (2006.01)

(52) U.S. Cl.
USPC ........................................................ 712/22

(58) Field of Classification Search ................ None
See application file for complete search history.

(56) References Cited

U.S. PATENT DOCUMENTS 5,596,760 A   1/1997 Ueda
6,526,430 B1  2/2003 Hung et al.

(Continued)

FOREIGN PATENT DOCUMENTS

EP   2 000 973   12/2008
GB   2 317 469   3/1998

OTHER PUBLICATIONS

UK Search Report dated Jan. 7, 2009 for GB 0818491.3.
UK Search Report dated Dec. 4, 2009 for GB 0915208.3.

(Continued)

*Primary Examiner* — Corey S Faherty
(74) *Attorney, Agent, or Firm* — Nixon & Vanderhye P.C.

(57) ABSTRACT

An apparatus and method for performing SIMD multiply-accumulate operations includes SIMD data processing circuitry responsive to control signals to perform data processing operations in parallel on multiple data elements. Instruction decoder circuitry is coupled to the SIMD data processing circuitry and is responsive to program instructions to generate the required control signals. The instruction decoder circuitry is responsive to a single instruction (referred to herein as a repeating multiply-accumulate instruction) having as input operands a first vector of input data elements, a second vector of coefficient data elements, and a scalar value indicative of a plurality of iterations required, to generate control signals to control the SIMD processing circuitry. In response to those control signals, the SIMD data processing circuitry performs the plurality of iterations of a multiply-accumulate process, each iteration involving performance of N multiply-accumulate operations in parallel in order to produce N multiply-accumulate data elements. For each iteration, the SIMD data processing circuitry determines N input data elements from said first vector and a single coefficient data element from the second vector to be multiplied with each of the N input data elements. The N multiply-accumulate data elements produced in a final iteration of the multiply-accumulate process are then used to produce N multiply-accumulate results. This mechanism provides a particularly energy efficient mechanism for performing SIMD multiply-accumulate operations, as for example are required for FIR filter processes.

32 Claims, 12 Drawing Sheets

|  | iteration 1 | iteration 2 | iteration M |
|---|---|---|---|
| vacc[0] = | vc[0] * vd[0] + | vc[1] * vd[1] +... | vc[M-1] * vd[M-1] |
| vacc[1] = | vc[0] * vd[1] + | vc[1] * vd[2] +... | vc[M-1] * vd[M] |
| vacc[2] = | vc[0] * vd[2] + | vc[1] * vd[3] +... | vc[M-1] * vd[M+1] |
| vacc[3] = | vc[0] * vd[3] + | vc[1] * vd[4] +... | vc[M-1] * vd[M+2] |
| ... | | | |
| vacc[N-1] = | vc[0] * vd[N-1] + | vc[1] * vd[N] +... | vc[M-1] * vd[M+N-2] |

10

U.S. PATENT DOCUMENTS

| | | | | |
|---|---|---|---|---|
| 6,952,709 B1 * | 10/2005 | Dujardin et al. | ............. | 708/300 |
| 7,054,895 B2 * | 5/2006 | Koba et al. | ................... | 708/201 |
| 7,219,212 B1 | 5/2007 | Sanghavi et al. | | |
| 7,376,812 B1 | 5/2008 | Sanghavi et al. | | |
| 7,434,034 B2 * | 10/2008 | Selvaggi et al. | ............. | 712/221 |
| 2002/0010848 A1 | 1/2002 | Kamano et al. | | |
| 2004/0250048 A1 | 12/2004 | Nakajima et al. | | |
| 2005/0144216 A1 | 6/2005 | Simkins et al. | | |
| 2006/0112159 A1 | 5/2006 | Sakaguchi et al. | | |

OTHER PUBLICATIONS

International Search Report and Written Opinion of the International Searching Authority dated Dec. 29, 2009 for PCT/GB2009/002225.
A. Shahbahrami et al, "Efficient Vectorization of the FIR Filter" *Proceedings of the 16$^{th}$ Annual Workshop on Circuits, Systems and Signal Processing*, ProRisc 2005, Nov. 2005, pp. 432-437.
H. Naess, "A programmable DSP for low-power, low-complexity baseband processing" Jan. 2007, pp. 1-70, Appendix.

* cited by examiner

|               | iteration 1        | iteration 2        |      | iteration M            |
|---------------|--------------------|--------------------|------|------------------------|
| vacc[0]   =   | vc[0] * vd[0]      + | vc[1] * vd[1]    +... | vc[M-1] * vd[M-1]      |
| vacc[1]   =   | vc[0] * vd[1]      + | vc[1] * vd[2]    +... | vc[M-1] * vd[M]        |
| vacc[2]   =   | vc[0] * vd[2]      + | vc[1] * vd[3]    +... | vc[M-1] * vd[M+1]      |
| vacc[3]   =   | vc[0] * vd[3]      + | vc[1] * vd[4]    +... | vc[M-1] * vd[M+2]      |
| ...           |                    |                    |      |                        |
| vacc[N-1] =   | vc[0] * vd[N-1]    + | vc[1] * vd[N]    +... | vc[M-1] * vd[M+N-2]    |

|               | iteration 1        | iteration 2        |      | iteration M            |
|---------------|--------------------|--------------------|------|------------------------|
| vacc[0]   +=  | vc[0] * vd[0]      + | vc[1] * vd[1]    +... | vc[M-1] * vd[M-1]      |
| vacc[1]   +=  | vc[0] * vd[1]      + | vc[1] * vd[2]    +... | vc[M-1] * vd[M]        |
| vacc[2]   +=  | vc[0] * vd[2]      + | vc[1] * vd[3]    +... | vc[M-1] * vd[M+1]      |
| vacc[3]   +=  | vc[0] * vd[3]      + | vc[1] * vd[4]    +... | vc[M-1] * vd[M+2]      |
| ...           |                    |                    |      |                        |
| vacc[N-1] +=  | vc[0] * vd[N-1]    + | vc[1] * vd[N]    +... | vc[M-1] * vd[M+N-2]    |

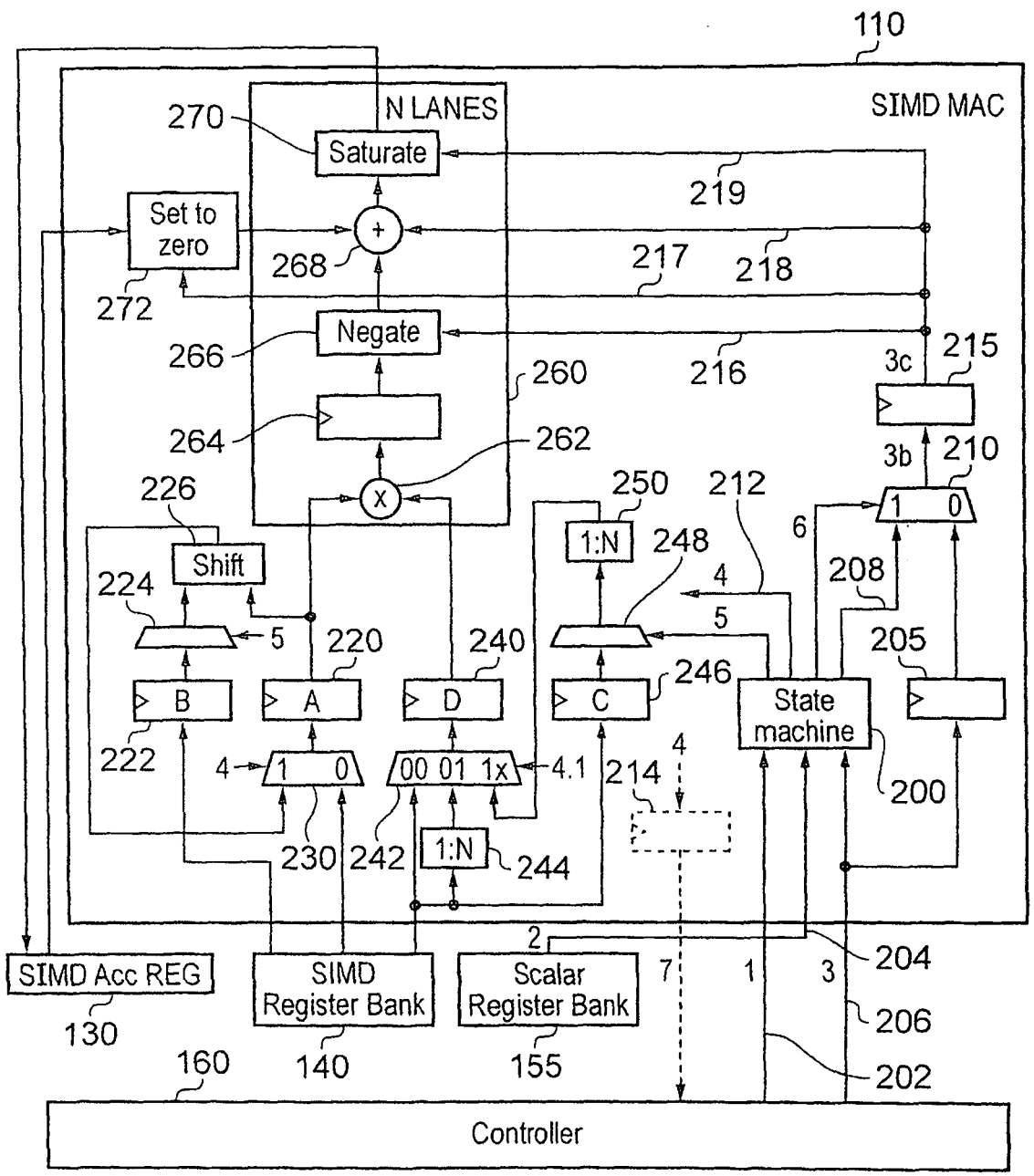

1 - repeating; indicates a repeating operation
2 - repeats; number of iterations (M)
3 - mult_cmd; multiplier command (add/sub, saturate, rounding, clear acc on start
3b - mult_cmd_ex; pipelined mult_cmd, and optionally modified by the state machine
3c - mult_cmd_wb; pipelined mult_cmd_ex
4 - mcyc_en; internal state, indicates that a repeating operation is running
5 - mcyc_elem_sel; selects the next coefficient (C) and the next data input element (B)
6 - mult_cmd_ex control signal; mcyc; mcyc_en OR mcyc_ex (mcyc_ex is pipelined mcyc_en)
7 - stall output; otional

FIG. 3

COMPLEX NUMBER EMBODIMENT $$vaccR = \sum_{k=0}^{M-1}(vdR[k]*vcR[k]) - \sum_{k=0}^{M-1}(vdI[k]*vcI[k])$$

$$vaccI = \sum_{k=0}^{M-1}(vdR[k]*vcI[k]) + \sum_{k=0}^{M-1}(vdI[k]*vcR[k])$$

COMPUTE ABOVE BY FOLLOWING FOUR REPEATING MAC INSTRUCTIONS

REPEATING MAC 1
(ADD VARIANT)
$\begin{bmatrix} \text{1st VECTOR} = vdR \\ \text{2ND VECTOR} = vcR \\ \text{SCALAR} = M \\ \text{INITIAL ACC} = 0 \end{bmatrix}$ ⟶ ACC RESULT 1

REPEATING MAC 2
(SUBTRACT VARIANT)
$\begin{bmatrix} \text{1st VECTOR} = vdI \\ \text{2ND VECTOR} = vcI \\ \text{SCALAR} = M \\ \text{INITIAL ACC} = \text{ACC RESULT 1} \end{bmatrix}$ ⟶ vaccR REPEATING MAC 3
(ADD VARIANT)
$\begin{bmatrix} \text{1st VECTOR} = vdR \\ \text{2ND VECTOR} = vcI \\ \text{SCALAR} = M \\ \text{INITIAL ACC} = 0 \end{bmatrix}$ ⟶ ACC RESULT 2

REPEATING MAC 4
(ADD VARIANT)
$\begin{bmatrix} \text{1st VECTOR} = vdI \\ \text{2ND VECTOR} = vcR \\ \text{SCALAR} = M \\ \text{INITIAL ACC} = \text{ACC RESULT 2} \end{bmatrix}$ ⟶ vaccI

FIG. 9

5 - mcyc_c_sel; selects the next coefficient (C)
5b - mcyc_b_sel; selects the next data input element (B)
8 - mcyc_a_en; enables update of the data input register (A)
9 - mcyc_acc_ctrl; controls read and write access for the SIMD accumulators

APPARATUS AND METHOD FOR PERFORMING SIMD MULTIPLY-ACCUMULATE OPERATIONS

BACKGROUND OF THE INVENTION

1. Field of the Invention

The present invention relates to an apparatus and method for performing SIMD (Single Instruction Multiple Data) multiply-accumulate (MAC) operations.

2. Description of the Prior Art

When it is necessary to perform a particular data processing operation on a number of separate data elements, one known approach for accelerating the performance of such an operation is to employ a SIMD (Single Instruction Multiple Data) approach. In accordance with the SIMD approach, multiple of the data elements are placed side-by-side within a register and then the operation is performed in parallel on those data elements.

One type of operation which can benefit from the SIMD approach is the multiply-accumulate operation, which can take the form of A+B×C, or A−B×C. The multiplication operation B×C is typically performed multiple times for different values of B and C, with each multiplication result then being added to (or subtracted) from the running accumulate value A.

Considering the operations required to generate a single multiply-accumulate result, it will be appreciated from the above discussion that a plurality of separate multiply operations are required, and by using SIMD data processing circuitry, a plurality of those required multiplications can be performed in parallel to increase the throughput of the multiply-accumulate operation.

However, there are also certain types of operation where multiple separate multiply-accumulate operations need to be performed in order to produce multiple multiply-accumulate results, but with there being significant overlap between the input data used for each multiply-accumulate operation. One particular example of an operation where multiple multiply-accumulate operations are required is the finite impulse response (FIR) filter operation, which is a standard signal processing task implemented in digital signal processors (DSPs). The FIR filter operation is commonly used in many signal processing applications, such as communication, audio processing, video processing or image processing.

Many contemporary digital signal processors, as well as general purpose microprocessors, use SIMD data processing circuitry in order to exploit the data-level parallelism present in operations such as the FIR filter operation. However, an important issue is how to effectively vectorise the FIR filter operation in order to exploit the SIMD capabilities of the data processing apparatus.

The article "Efficient Vectorization of the FIR Filter" by A Shahbahrami et al, Computer Engineering Laboratory, Delft University of Technology, the Netherlands (appearing on the Internet at http://ce.et.tudelft.nl/publicationfiles/1090_509_shahbahrami_prorisc2005.pdf) summarises various techniques for vectorising an FIR filter operation. In accordance with a first technique, the FIR filter is vectorised by vectorising the inner loop, such that the inner loop calculates several terms of a single output in parallel. Hence, by such an approach, multiple of the multiply operations required to form a single multiply-accumulate result are performed in parallel within the SIMD data processing circuitry during a single iteration, and accordingly each multiply-accumulate result is determined sequentially, with the SIMD capabilities of the processing circuitry being used to speed up the computation of each multiply-accumulate result. In accordance with an alternative technique described, the outer loop of the FIR filter is vectorised, such that the inner loop computes one term of several outputs in parallel. Hence, in accordance with this technique, in each iteration, one multiply-accumulate computation is performed in respect of each of the required multiply-accumulate results, so that all of the required multiply-accumulate operations are performed in parallel, and the final multiply-accumulate results for each of the multiply-accumulate operations become available following the final iteration of the process. The article also describes a third mechanism where the inner and outer loops are vectorised simultaneously.

One technique for vectorising the inner loop is described in the article "AltiVec™ Technology: A second Generation SIMD Microprocessor Architecture" by M Phillip, Motorola Inc, Austin, Tex. (appearing on the Internet at http://www.hotchips.org/archives/hc10/2_Mon/HC10.S5/HC10.5.3.pdf), where sum-across type instructions are used. This document describes techniques for vectorising either the inner or the outer FIR loop using the AltiVec multiply instructions. However, the outer loop technique uses vector multiply (or multiply-accumulate) operations that do not perform data re-arrangement function at the same time.

The publication "A Programmable DSP for Low-Power, Low-Complexity Baseband Processing" by H Naess, Norwegian University of Science and Technology, Department of Electronics and Telecommunications (appearing on the Internet at http://www.diva-portal.org/ntnu/abstract.xsql?dbid=1095) describes a technique for vectorising the outer loop, giving rise to repeated vector accumulate and shift operations. In particular, FIG. 9 of that publication shows an operation using two vector inputs and an internal shift register. This operation is executed multiple times through the issuance of multiple instructions within a repeat loop (as for example discussed in Table 10 of that document). Whilst the use of the internal shift register allows some internal rearrangement of data, it is necessary to iterate through the repeat loop multiple times in order to perform the required computations, and each time the repeat loop is repeated, instructions need to be decoded and executed, and new data values need to be accessed from memory.

The prior art techniques described above are generally aimed at improving performance of the FIR computations. However, another significant issue is power consumption. The inventors of the present invention realised that when performing sequences of MAC operations, such as are required when performing FIR operations, there are three key activities, namely instruction fetch and decode, the multiply-accumulate computations, and vector data re-arrangement computations required to order the data elements appropriately prior to each iteration. Further, the inventors noted that significant power was being consumed in the instruction fetch and decode and the vector data re-arrangement computations, for example 25-40% of the total power consumed.

Accordingly, it would be desirable to provide an improved technique for performing SIMD multiply-accumulate operations which reduces the power consumption when compared with the known prior art techniques.

SUMMARY OF THE INVENTION

Viewed from a first aspect, the present invention provides a data processing apparatus comprising: SIMD data processing circuitry responsive to control signals to perform data processing operations in parallel on multiple data elements; instruction decoder circuitry coupled to said SIMD data processing circuitry and responsive to program instructions to generate said control signals; said instruction decoder circuitry being responsive to a repeating multiply-accumulate (repeating MAC) instruction having as input operands a first vector of input data elements, a second vector of coefficient data elements, and a scalar value indicative of a plurality of iterations M required, to generate control signals to control said SIMD data processing circuitry: to perform said plurality of iterations of a multiply-accumulate process, each iteration of the multiply-accumulate process comprising performing N multiply-accumulate operations in parallel in order to produce N multiply-accumulate data elements; for each iteration, to determine N input data elements from said first vector and a single coefficient data element from said second vector to be multiplied with each of the N input data elements during the N multiply-accumulate operations; and to output N multiply-accumulate results derived from the N multiply-accumulate data elements produced in a final iteration of the multiply-accumulate process.

In accordance with the present invention, a single instruction is provided (referred to herein as a repeating MAC instruction) which has as input operands a first vector of input data elements, a second vector of coefficient data elements, and a scalar value indicative of a plurality of iterations M required. Instruction decoder circuitry is responsive to such a repeating MAC instruction to generate control signals used to control SIMD data processing circuitry to perform a plurality of iterations of a multiply-accumulate process, where each iteration involves the performance of N multiply-accumulate operations in parallel. During each iteration, the SIMD data processing circuitry determines N input data elements from the first vector and a single coefficient data element from the second vector. After performance of the plurality of iterations the SIMD data processing circuitry then outputs N multiply-accumulate results.

Accordingly, using the present invention, a single instruction can be used to cause the SIMD data processing circuitry to perform a plurality of iterations of a multiply-accumulate process determined by a scalar value provided as an input operand of that instruction, in order to directly produce a plurality of multiply-accumulate results. Since all of the data elements required for all of the specified iterations can be derived directly from the first and second vectors provided as input operands of the instruction, a significant reduction in energy consumption can be realised when compared with the known prior art techniques which require the execution of a program loop multiple times, with accesses to memory during each time through the loop. In particular, the invention provides a single instruction that can execute without further register or instruction reads in order to generate a plurality of multiply-accumulate results, saving significant energy consumption when compared with known prior art techniques.

The repeating MAC instruction of the present invention may be used for a variety of purposes. However, in one embodiment the repeating MAC instruction is used to perform an FIR filter operation, and the N multiply-accumulate results produced form N FIR results. Hence, in accordance with such embodiments of the present invention, a single instruction can be used to cause the SIMD data processing circuitry to perform multiple iterations of a multiply-accumulate process in order to generate directly from that single instruction a plurality of FIR results. Such an approach provides a particularly energy efficient mechanism for generating such FIR results.

The SIMD data processing circuitry can be arranged in a variety of ways. However, in one embodiment the SIMD data processing circuitry has a state machine for determining the N input data elements and the single coefficient data element for each iteration. In one particular embodiment, one of the control signals provided to the SIMD data processing circuitry identifies the number of iterations M required, and the state machine generates internal control signals which are altered dependent on the iteration being performed, and are used to select the input data elements and the single coefficient data element for each iteration.

In one particular embodiment, the number of input data elements in the first vector is at least N+M−1, and the state machine determines the N input data elements for iteration P by causing a shift operation to be performed with respect to the N data elements used for iteration P−1. When the first iteration is performed, an initial N input data elements are selected.

In one embodiment, the state machine determines a different coefficient data element from said second vector for each iteration. However, in some embodiments the coefficient data element is kept the same for more than one iteration. This may, for example, enable a number of separate multiply-accumulate processes to be performed in response to the single instruction, with N multiply-accumulate results being produced for each multiply-accumulate process after the final iteration. Alternatively, a number of separate multiply-accumulate processes may be performed in response to a single instruction by changing the coefficient data element every iteration, but by keeping the input data elements the same for more than one iteration.

In one embodiment, the repeating MAC instruction also has as an input operand a vector of initial multiply-accumulate data elements. In an alternative embodiment, no such vector of initial multiply-accumulate data elements may be provided, and instead the accumulator is initialised to zero at the start of the process.

Since in accordance with the present invention the repeating MAC instruction specifies as one of its input operands a scalar value indicative of a plurality of iterations required, the number of clock cycles taken by the SIMD data processing circuitry to perform the required computations in response to the repeating MAC instruction is not predetermined, and will vary significantly dependent on the scalar value specified for any particular instance of the repeating MAC instruction. Typically, there will be certain dependencies between the activities of various other components of the data processing apparatus and the computations performed by the SIMD data processing circuitry in response to the repeating MAC instruction. For example, subsequent instructions fetched from program memory for execution by the SIMD data processing circuitry will not be able to be executed by the SIMD data processing circuitry until it has finished the computations required in respect of the repeating MAC instruction. Further, instructions fetched for execution by other components of the data processing apparatus may also not be able to be executed until the SIMD data processing circuitry has completed the computations required in response to the repeating MAC instruction, for example if those instructions specify as an input operand any of the N multiply-accumulate results.

To alleviate unnecessary power consumption resulting from such issues, in one embodiment the state machine determines the number of iterations M from the scalar value, and asserts a stall signal to one or more components of the data processing apparatus whilst at least one of the plurality of iterations are being performed. In one particular example, the stall signal is used to suspend instruction fetching whilst the stall signal is asserted.

The length of time that the stall signal is asserted will be dependent on the particular embodiment, taking into account aspects such as pipeline depths of particular components, etc. In one embodiment the stall signal is asserted during all but one iteration of the plurality of iterations, thereby giving rise to significant power savings, for example by avoiding any unnecessary power consumed in instruction fetching activity.

Whilst in one embodiment one iteration is completed each clock cycle, it will be appreciated that there is no requirement for one iteration to be completed each clock cycle, and in alternative embodiments there may be more than one clock cycle between completion of each iteration.

In one embodiment, the data processing apparatus further comprises a SIMD register bank for storing data elements, the SIMD data processing circuitry accessing said first and second vectors from registers of the SIMD register bank prior to performing said plurality of iterations of the multiply-accumulate process, whereby no further access to the SIMD register bank is required in respect of the first and second vectors during performance of said plurality of iterations of the multiply-accumulate process. By avoiding the need to access the SIMD register bank during performance of the plurality of iterations of the multiply-accumulate process, significant power savings are realised.

In one particular embodiment, the first vector of input data elements has a number of input data elements which is a multiple of N, and the SIMD data processing circuitry accesses said input data elements by accessing multiple registers of the SIMD register bank, each of said multiple registers containing N input data elements. In one embodiment the second vector of coefficient data elements has a number of coefficient data elements less than or equal to N, and those coefficient data elements are accessed from one register of the SIMD register bank. However, in an alternative embodiment the second vector of coefficient data elements may have a number of coefficient data elements which is a multiple of N, and the SIMD data processing circuitry accesses said coefficient data elements by accessing multiple registers of the SIMD register bank.

In one embodiment, the data processing apparatus further comprises a multiply-accumulate register for storing N multiply-accumulate data elements. Whilst in one embodiment this multiply-accumulate register may be provided by one or more registers within the SIMD register bank, in an alternative embodiment the multiply-accumulate register is provided separately to the SIMD register bank.

In one embodiment, each of the input data elements comprise X bits, each of the coefficient data elements comprise Y bits, and each multiply-accumulate data element stored in the multiply-accumulate register is at least X+Y bits in size. Since the multiply-accumulate register stores N multiply-accumulate data elements, it will be appreciated that the multiply-accumulate register needs to be wider than the registers used to store the input data elements or coefficient data elements within the SIMD register bank. Whilst X and Y can be different, in one embodiment X and Y are the same such that the input data elements and coefficient data elements are of the same size.

Whilst each multiply-accumulate data element may be exactly X+Y bits in size, in one embodiment the multiply-accumulate register stores the multiply-accumulate data elements in extended form, the extended form including additional bits used for determining an overflow. Hence, when the N multiply-accumulate results are derived from the N multiply-accumulate data elements produced in a final iteration of the multiply-accumulate process, the additional bits can be taken into account in order to detect situations where an overflow has occurred, and to modify the relevant multiply-accumulate data elements accordingly. The N multiply-accumulate results can be derived from the extended form in a number of ways. In one embodiment the extended form elements are saturated to the size of a result element such that values outside the range of the result element are replaced by their closest in range value. In another embodiment the result elements are formed by taking a selected portion of the extended form elements and discarding the remaining bits. Other embodiments may do both and saturate a selected portion of the extended form elements.

Whilst in one embodiment the input data elements and coefficient data elements are real numbers, in other embodiments at least one of the input data elements and the coefficient data elements are complex numbers that comprise real and imaginary parts. In one such complex number embodiment, each iteration of the multiply-accumulate process comprises performing N complex multiply-accumulate operations in parallel in order to produce N complex multiply-accumulate data elements, and the N multiply-accumulate results output are complex numbers.

In one embodiment, only one of the input data elements and the coefficient data elements will be complex numbers. For example the input data elements may be complex numbers whilst the coefficient data elements are real numbers. In one such embodiment the coefficient data elements may be converted into complex form before performing the complex multiply-accumulate operations.

In another embodiment, both the input data elements and the coefficient data elements are complex numbers that comprise real and imaginary parts.

In one embodiment, each complex multiply-accumulate operation involves performance of a sequence of multiply, add and subtract operations in order to produce real and imaginary parts of the corresponding complex multiply-accumulate data element.

In one embodiment the coefficient data elements are complex numbers and the complex coefficient data element may be conjugated before the N complex multiply-accumulate operations are performed. Typically this involves negating the imaginary part of the complex coefficient data element. The ability to perform such conjugation can provide flexibility in the way the complex numbers are treated during the plurality of iterations of the multiply-accumulate process. There are a variety of ways in which such conjugation can be specified, but in one embodiment both non-conjugate and conjugate variants of the repeating MAC instruction can be provided. In response to such a conjugate repeating MAC instruction, the instruction decoder circuitry is arranged to generate an additional control signal to cause the SIMD data processing circuitry to negate the imaginary part of the complex coefficient data element before performing the N complex multiply-accumulate operations.

Whilst in one embodiment the multiply-accumulate operations may cause each multiplication result to be added to the running accumulate value, in an alternative embodiment the multiply-accumulate operations may form multiply-subtract operations, where each multiplication result is subtracted from the running accumulate value. In one particular embodiment, a repeating MAC instruction causing a plurality of iterations of a multiply-accumulate process to be performed during which the multiply-accumulate operations cause the multiplication result to be added to the running accumulate value can be followed by a further repeating MAC instruction causing a plurality of iterations of the multiply-accumulate process to be performed, where this time the multiply-accumulate operations performed cause the multiplication results to be subtracted from the running accumulate value. Such combinations of instructions can be useful, for example when performing operations on complex numbers.

In one embodiment, one of the control signals produced by the instruction decoder circuitry specifies whether rounding is required, and if rounding is required the state machine is arranged to cause a rounding increment to be injected into each multiply-accumulate operation performed in one of said plurality of iterations, for example said final iteration. Hence, the repeating multiply-accumulate instruction may specify that rounding is required, and the state machine is in such instances arranged to allow all but the final iteration to proceed without rounding, and for a rounding increment to then be injected into each multiply-accumulate operation performed in the final iteration, so as to implement the required rounding. Considering by way of an example a situation where each of the input data elements and coefficient data elements are 16 bits in length, then the multiply-accumulate data elements produced will be 32 bits in size. If rounding is not required, then the full 32-bit result will be output. However, if rounding is required, then the most significant 16 bits need to be output as the result, but with the rounding operation performed to take account of the least significant 16 bits that will not directly be included in the result. To perform the required rounding, a rounding increment is injected at bit position 15 (assuming the 32 bit number is given by bit positions 0 to 31, and bit position 31 is the most significant bit). When rounding is specified by the repeating MAC instruction, the state machine ensures that rounding is only applied during the final iteration, so as to ensure that the rounding process is only applied to the final multiply-accumulate data elements used to form the final multiply-accumulate results.

However, whilst in the above described embodiment the rounding increment is injected during the final iteration, in an alternative embodiment the rounding increment could be injected in any one iteration, so rounding need not be left until the final iteration.

In one embodiment, one of the control signals produced by the instruction decoder circuitry specifies whether the multiply-accumulate data elements to be produced are saturating or non-saturating, and accumulate circuitry within the SIMD data processing circuitry is configured dependent on said control signal. Hence, in embodiments of the present invention, saturating and non-saturating variants of the repeating MAC instruction can be specified.

Whilst the constraints placed on the choice of scalar value will be implementation dependent, in one embodiment the scalar value is constrained to be less than or equal to N.

In such embodiments, assuming the number of iterations required is less than or equal to N, it is possible via a single repeating MAC instruction to perform the plurality of iterations of the multiply-accumulate process in order to produce N multiply-accumulate results, with these multiply-accumulate results representing the actual final results needed. However, if more than N iterations are required, then this can be achieved through the use of a sequence of repeating MAC instructions, with each subsequent repeating MAC instruction taking as an input the multiply-accumulate results from the preceding repeating MAC instruction. Hence, in one embodiment, if N+Q iterations are required (where Q is less than or equal to N), then a first repeating MAC instruction has a scalar value indicating N iterations, and is followed by a further repeating MAC instruction having a scalar value indicating Q iterations and identifying as a vector of initial multiply-accumulate data elements the N multiply-accumulate results generated by the SIMD data processing circuitry in response to the first repeating MAC instruction.

In one embodiment, if said scalar value as specified by the repeating MAC instruction is larger than a maximum number of iterations that can be performed (typically the number of coefficient data elements in the second vector), then the scalar value is set equal to said maximum number and said SIMD data processing circuitry performs said maximum number of iterations of said multiply-accumulate process.

In one embodiment, the instruction decoder circuitry is responsive to a sequence of repeating MAC instructions to generate control signals to control said SIMD data processing circuitry to perform a sequence of multiply-accumulate stages, each multiply-accumulate stage performing said plurality of iterations of said multiply-accumulate process, and at least one multiply-accumulate stage using as an input the N multiply-accumulate results generated by a previous multiply-accumulate stage. Whilst such an approach can be used for a variety of reasons, for example because the number of iterations required exceeds N, in one particular embodiment the sequence of multiply-accumulate stages are used to perform repeating MAC operations on complex numbers. In such situations, both the input data elements and the coefficient data elements will include real and imaginary parts and four multiply-accumulate stages are required in order to produce the required real and imaginary multiply-accumulate results.

In one embodiment where a sequence of multiply-accumulate stages need to be performed, then the instruction decoder circuitry can be arranged to be responsive to a single repeating MAC instruction to generate control signals to control said SIMD data processing circuitry to perform at least two multiply-accumulate stages, each multiply-accumulate stage performing said plurality of iterations of said multiply-accumulate process, with the input data elements and the coefficient data elements required for each multiply-accumulate stage being determined from the first and second vectors. Hence, in response to a single repeating MAC instruction, multiple of the multiply-accumulate stages can be executed in parallel, in one particular embodiment two of the multiply-accumulate stages being able to be performed in parallel. This is useful where either the input data elements or the coefficient data elements are re-used for two or more of the stages, since it means that those data elements only need to be accessed once from the register bank/memory, thereby giving rise to further improved energy savings.

In one particular embodiment, the input data elements are reused between two multiply-accumulate stages, each iteration for one stage being followed by a counterpart iteration for the other stage using the same N input data elements. Each iteration the coefficient data elements are altered, such that different coefficient data elements are used for each of the two stages. In one particular embodiment, the scalar value M is constrained to be less than or equal to N/2, so that the required coefficient data elements can be provided by the contents of a SIMD register containing N coefficient data elements. However, alternatively this restriction on M can be removed by using the contents of more than one SIMD register to provide the second vector of coefficient data elements.

Viewed from a second aspect, the present invention provides a method of processing data using SIMD data processing circuitry responsive to control signals to perform data processing operations in parallel on multiple data elements and instruction decoder circuitry coupled to said SIMD data processing circuitry and responsive to program instructions to generate said control signals, said method comprising the steps of: decoding a repeating multiply-accumulate (repeating MAC) instruction having as input operands a first vector of input data elements, a second vector of coefficient data elements, and a scalar value indicative of a plurality of iterations M required, to generate control signals; and controlling said SIMD data processing circuitry with said control signals to produce multiply-accumulate results by the steps of: performing said plurality of iterations of a multiply-accumulate process, each iteration of the multiply-accumulate process comprising performing N multiply-accumulate operations in parallel in order to produce N multiply-accumulate data elements; for each iteration, determining N input data elements from said first vector and a single coefficient data element from said second vector to be multiplied with each of the N input data elements during the N multiply-accumulate operations; and outputting N multiply-accumulate results derived from the N multiply-accumulate data elements produced in a final iteration of the multiply-accumulate process.

Viewed from a third aspect, the present invention provides a virtual machine implementation of a data processing apparatus, said virtual machine implementation being responsive to a repeating multiply-accumulate (repeating MAC) instruction having as input operands a first vector of input data elements, a second vector of coefficient data elements, and a scalar value indicative of a plurality of iterations M required, to produce multiply-accumulate results by the steps of: performing said plurality of iterations of a multiply-accumulate process, each iteration of the multiply-accumulate process comprising performing N multiply-accumulate operations in parallel in order to produce N multiply-accumulate data elements; for each iteration, determining N input data elements from said first vector and a single coefficient data element from said second vector to be multiplied with each of the N input data elements during the N multiply-accumulate operations; and outputting N multiply-accumulate results derived from the N multiply-accumulate data elements produced in a final iteration of the multiply-accumulate process.

Viewed from a fourth aspect, the present invention provides a data processing apparatus comprising: SIMD data processing means for performing data processing operations in parallel on multiple data elements in response to control signals; and instruction decoder means coupled to said SIMD data processing means for generating said control signals in response to program instructions; wherein said instruction decoder means, in response to a repeating multiply-accumulate (repeating MAC) instruction having as input operands a first vector of input data elements, a second vector of coefficient data elements, and a scalar value indicative of a plurality of iterations M required, generates control signals to control said SIMD data processing means to produce multiply-accumulate results by the steps of: performing said plurality of iterations of a multiply-accumulate process, each iteration of the multiply-accumulate process comprising performing N multiply-accumulate operations in parallel in order to produce N multiply-accumulate data elements; for each iteration, determining N input data elements from said first vector and a single coefficient data element from said second vector to be multiplied with each of the N input data elements during the N multiply-accumulate operations; and outputting N multiply-accumulate results derived from the N multiply-accumulate data elements produced in a final iteration of the multiply-accumulate process.

BRIEF DESCRIPTION OF THE DRAWINGS

The present invention will be described further, by way of example only, with reference to embodiments thereof as illustrated in the accompanying drawings, in which:

FIGS. 1A and 1B schematically illustrate the iterations of a multiply-accumulate process performed by SIMD data processing circuitry in response to a repeating multiply-accumulate instruction in accordance with one embodiment of the present invention;

FIG. 3 is a diagram illustrating in more detail the SIMD MAC circuit of one embodiment of the present invention;

FIG. 9 schematically illustrates how a sequence of repeating MAC instructions of embodiments of the present invention may be utilised to perform FIR filter operations on complex numbers;

DESCRIPTION OF EMBODIMENTS

Figure 2:
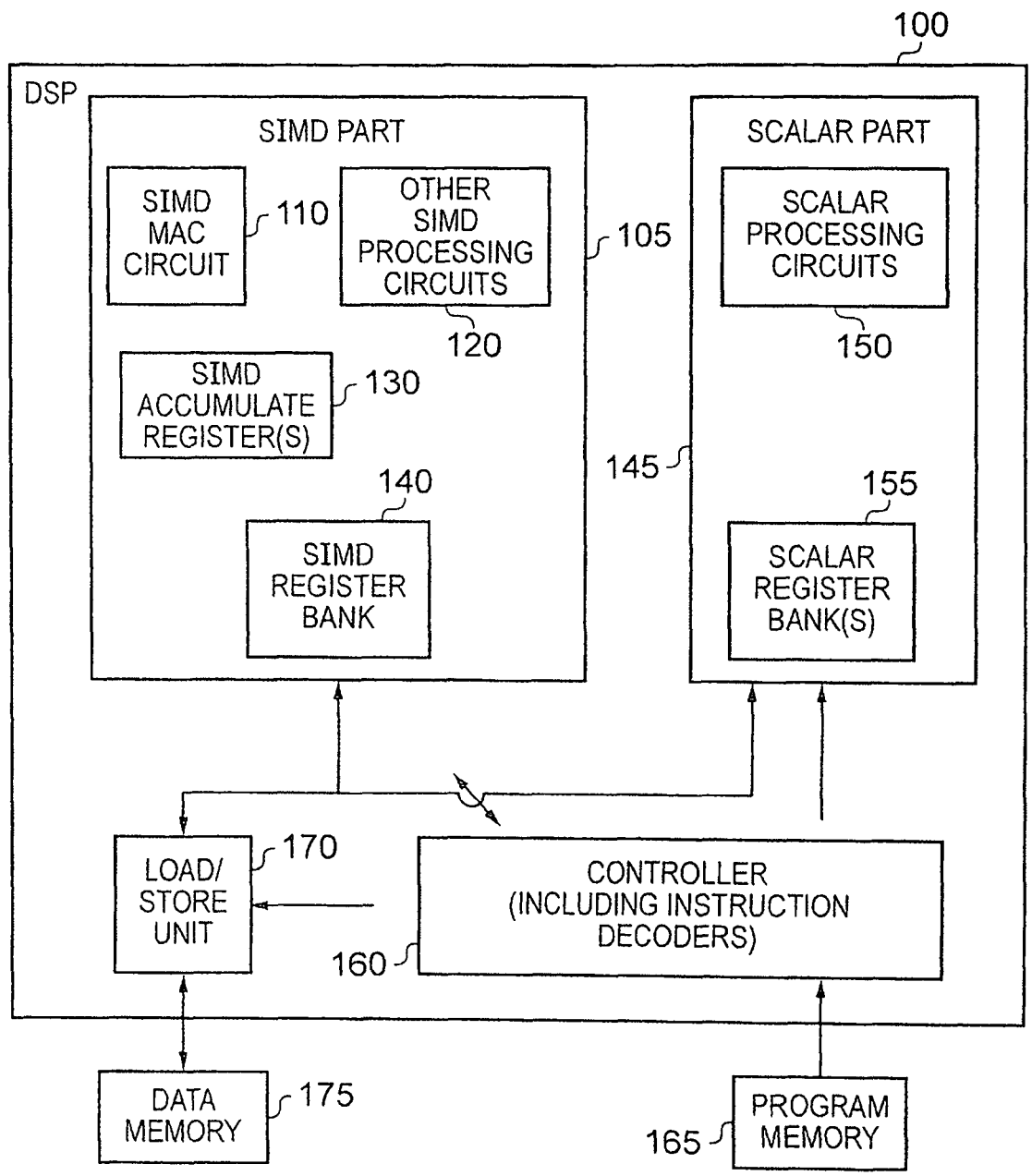
FIG. 2 is a block diagram schematically illustrating a data processing apparatus in which the techniques of embodiments of the present invention may be employed.

In accordance with embodiments of the present invention, a repeating multiply-accumulate (repeating MAC) instruction is provided which takes as input operands a first vector of input data elements (vd), a second vector of coefficient data elements (vc), and a scalar value indicative of a plurality of iterations M required. Optionally, the repeating MAC instruction may also take as an input operand a vector of initial multiply-accumulate data elements (also referred to herein as initial accumulate data elements).

When this instruction is decoded by instruction decoder circuitry, control signals are generated that are used to control SIMD data processing circuitry in order to produce a vector accumulator output given by the following equation:

$$\text{vacc}[i]=vc[0]*vd[i]+\ldots+vc[M-1]*vd[i+M-1] \text{ for all 'i' in the vector}$$

If a vector of initial multiply-accumulate data elements is specified this equation becomes:

$$\text{vacc}[i]=\text{vacc}[i]+vc[0]*vd[i]+\ldots+vc[M-1]*vd[i+M-1] \text{ for all 'i' in the vector}$$

The SIMD data processing circuitry can be viewed as providing N lanes of parallel processing, and in one embodiment the variable "i" in the above equation takes all values between 0 and N−1. Accordingly, as illustrated in FIGS. 1A and 1B, the SIMD data processing circuitry will produce a vector accumulator output 10 containing N multiply-accumulate results, with these N multiply-accumulate results being produced after performance of the M iterations shown in FIG. 1A or 1B. FIG. 1A illustrates the iterations of the multiply-accumulate process performed if no vector of initial multiply-accumulate data elements is specified, and FIG. 1B illustrates the iterations of the multiply-accumulate process performed if a vector of initial multiply-accumulate data elements is specified.

It should be noted that in FIGS. 1A and 1B, and indeed in the earlier mentioned equations, the number in square brackets after vacc, vc or vd indicates the particular data element of those vectors being operated on. Accordingly, as is apparent from FIG. 1A or 1B, during the first iteration the first coefficient data element from the vector of coefficients vc is used in all of the N lanes of parallel processing, with each lane taking a different input data element from the vector of input data elements vd, starting with the first input data element. In iteration 2, the next coefficient data element is used across all lanes, and the vector of input data elements used is similar to that used in the first iteration, but shifted by one data element position. The manner in which the coefficient data elements and input data elements are altered between each iteration is the same such that by the M-th iteration, the coefficient data elements and input data elements being used are those shown in the right hand column of FIG. 1A or 1B.

Data elements in vectors vacc, vc and vd can be real or complex numbers. Accordingly, each iteration can perform real or complex multiply-accumulate operations, with the M-th iteration producing N real or complex results. When considering the example where complex multiply-accumulate operations are performed, each of the multiplications in the boxes of FIGS. 1A and 1B will involve the performance of a sequence of multiply, add and subtract operations in order to produce real and imaginary parts of the corresponding complex multiplication result data element. In particular, considering the general case of vc(k)*vd(l), the following computations will be performed:

Multiply real part result=[vdR(l)*vcR(k)]−[vdI(l)*vcI(k)]

Multiply imaginary part result=[vdR(l)*vcI(k)]+[vdI(l)*vcR(k)]

(where "R" denotes a real component and "I" denotes an imaginary component).

The real and imaginary multiply results will then be accumulated with the previous real and imaginary accumulate results.

Whilst in the above example both the input data elements and the coefficient data elements are complex numbers, in an alternative embodiment only one of these may be provided as complex numbers in the input vectors. For example, whilst the input data elements may be provided as complex numbers, the coefficient data elements may be provided as real numbers.

In one embodiment, such a situation is treated as a special case of the complex embodiment described above, where data elements in vd and vacc vectors are complex while coefficient data elements in vc are real. To perform this operation, the real vc elements may be internally converted to complex numbers as follows:

internal_vcR[k]=vc[k]

internal_vcI[k]=0 and then the complex multiply-accumulate operation can be performed as discussed above.

As mentioned earlier, in accordance with embodiments of the present invention, all of the operations illustrated in FIG. 1A or 1B can be performed by the SIMD data processing circuitry in response to a single repeating MAC instruction, and accordingly the N multiply-accumulate results 10 are all produced in response to the single instruction. Further, in embodiments of the present invention, all of the required input data elements and coefficient data elements are read from a SIMD register bank into internal registers of the SIMD data processing circuitry prior to the computations shown in FIG. 1A or 1B being performed, thus avoiding any need to further access the SIMD register bank during performance of the computations illustrated in FIG. 1A or 1B. To enable such functionality, the first vector of input data elements will include at least N+M−1 data elements, and the second vector of coefficient data elements will include at least M coefficient data elements. In one particular embodiment, the scalar value M is restricted to be less than or equal to N, and the above requirement is met by providing the contents of two N-element SIMD registers to form the first vector of input data elements, and by providing the contents of one N-element SIMD register to provide the second vector of coefficient data elements.

Whilst the operations performed in response to the repeating MAC instruction may be useful in a variety of situations, they provide a particularly energy efficient mechanism for performing FIR filter operations, with each of the M multiply-accumulate results in the vector accumulator output 10 forming an FIR result.

The following C code provides functional models of the above described operation of FIGS. 1A and 1B in terms of standard vector extracts and vector by scalar multiplies, for each of a number of variants of the repeating MAC functional model.

1) Repeating MAC with the initial accumulator set to zero.

```
vint32L_t vmlal_rz_s16(vint16_t vd0, vint16_t vd1, vint16_t vc,
uint_t M)
{
    uint_t P;
    vint32L_t vacc=vdup_n_s32L(0);
    M = (M>=ELEMENTS16) ? ELEMENTS16 : M;
    M = (M<1) ? 0 : (M−1);
    for (P=0; P<M; P++)
    {
        vacc = vmlal_n_s16(vacc, vext_s16(vd0,vd1,P),
        vget_lane_s16(vc,P));
    }
    return vmlal_n_s16(vacc, vext_s16(vd0,vd1,P),
    vget_lane_s16(vc,P));
}
```

2) Repeating MAC with the initial accumulator as an input vector.

```
vint32L_t vmlal_r_s16(vint32L_t vacc, vint16_t vd0, vint16_t vd1,
vint16_t vc, uint_t M)
{
    uint_t P;
    M = (M>=ELEMENTS16) ? ELEMENTS16 : M;
    M = (M<1) ? 0 : (M−1);
    for (P=0; P<M; P++)
    {
```

```
    vacc = vmlal_n_s16(vacc, vext_s16(vd0,vd1,P), vget_lane_s16(vc,P));
  }
  return vmlal_n_s16(vacc, vext_s16(vd0,vd1,P), vget_lane_s16(vc,P));
}
```

3) Saturating repeating MAC with the initial accumulator set to zero.

```
vint32L_t vqdmlal_rz_s16(vint16_t vd0, vint16_t vd1, vint16_t vc, uint_t M)
{
  uint_t P;
  vint32L_t vacc=vdup_n_s32L(0);
  M = (M>=ELEMENTS16) ? ELEMENTS16 : M;
  M = (M<1) ? 0 : (M-1);
  for (P=0; P<M; P++)
  {
    vacc = vqdmlal_n_s16(vacc, vext_s16(vd0,vd1,P),
           vget_lane_s16(vc,P));
  }
  return vqdmlal_n_s16(vacc, vext_s16(vd0,vd1,P), vget_lane_s16(vc,P));
}
```

4) Saturating repeating MAC with the initial accumulator as an input vector.

```
vint32L_t vqdmlal_r_s16(vint32L_t vacc, vint16_t vd0, vint16_t vd1,
vint16_t vc, uint_t M)
{
  uint_t P;
  M = (M>=ELEMENTS16) ? ELEMENTS16 : M;
  M = (M<1) ? 0 : (M-1);
  for (P=0; P<M; P++)
  {
    vacc = vqdmlal_n_s16(vacc, vext_s16(vd0,vd1,P),
           vget_lane_s16(vc,P));
  }
  return vqdmlal_n_s16(vacc, vext_s16(vd0,vd1,P), vget_lane_s16(vc,P));
}
```

5) Saturating and rounding repeating MAC with the initial accumulator set to zero.

```
vint32L_t vqrdmlal_rz_s16(vint16_t vd0, vint16_t vd1, vint16_t vc,
uint_t M)
{
  uint_t P;
  vint32L_t vacc=vdup_n_s32L(0);
  M = (M>=ELEMENTS16) ? ELEMENTS16 : M;
  M = (M<1) ? 0 : (M-1);
  for (P=0; P<M; P++)
  {
    vacc = vqdmlal_n_s16(vacc, vext_s16(vd0,vd1,P),
           vget_lane_s16(vc,P));
  }
  return vqrdmlal_n_s16(vacc, vext_s16(vd0,vd1,P), vget_lane_s16(vc,P));
}
```

6) Saturating and rounding repeating MAC with the initial accumulator as an input vector.

```
vint32L_t vqrdmlal_r_s16(vint32L_t vacc, vint16_t vd0, vint16_t vd1,
vint16_t vc, uint_t M)
{
  uint_t P;
  M = (M>=ELEMENTS16) ? ELEMENTS16 : M;
  M = (M<1) ? 0 : (M-1);
  for (P=0; P<M; P++)
  {
    vacc = vqdmlal_n_s16(vacc, vext_s16(vd0,vd1,P),
           vget_lane_s16(vc,P));
  }
  return vqrdmlal_n_s16(vacc, vext_s16(vd0,vd1,P), vget_lane_s16(vc,P));
}
```

7) Repeating multiply-and-subtract with the initial accumulator set to zero.

```
vint32L_t vmlsl_rz_s16(vint16_t vd0, vint16_t vd1, vint16_t vc, uint_t M)
{
  uint_t P;
  vint32L_t vacc=vdup_n_s32L(0);
  M = (M>=ELEMENTS16) ? ELEMENTS16 : M;
  M = (M<1) ? 0 : (M-1);
  for (P=0; P<M; P++)
  {
    vacc = vmlsl_n_s16(vacc, vext_s16(vd0,vd1,P), vget_lane_s16(vc,P));
  }
  return vmlsl_n_s16(vacc, vext_s16(vd0,vd1,P), vget_lane_s16(vc,P));
}
```

8) Repeating multiply-and-subtract with the initial accumulator as an input vector.

```
vint32L_t vmlsl_r_s16(vint32L_t vacc, vint16_t vd0, vint16_t vd1,
vint16_t vc, uint_t M)
(
  uint_t P;
  M = (M>=ELEMENTS16) ? ELEMENTS16 : M;
  M = (M<1) ? 0 : (M-1);
  for (P=0; P<M; P++)
  {
    vacc = vmlsl_n_s16(vacc, vext_s16(vd0,vd1,P), vget_lane_s16(vc,P));
  }
  return vmlsl_n_s16(vacc, vext_s16(vd0,vd1,P), vget_lane_s16(vc,P));
}
```

9) Saturating repeating multiply-and-subtract with the initial accumulator set to zero.

```
vint32L_t vqdmlsl_rz_s16(vint16_t vd0, vint16_t vd1, vint16_t vc, uint_t M)
{
  uint_t P;
  vint32L_t vacc=vdup_n_s32L(0);
  M = (M>=ELEMENTS16) ? ELEMENTS16 : M;
  M = (M<1) ? 0 : (M-1);
  for (P=0; P<M; P++)
  {
    vacc = vqdmlsl_n_s16(vacc, vext_s16(vd0,vd1,P),
           vget_lane_s16(vc,P));
  }
  return vqdmlsl_n_s16(vacc, vext_s16(vd0,vd1,P), vget_lane_s16(vc,P));
}
```

10) Saturating repeating multiply-and-subtract with the initial accumulator as an input vector.

```
vint32L_t vqdmlsl_r_s16(vint32L_t vacc, vint16_t vd0, vint16_t vd1,
vint16_t vc, uint_t M)
{
  uint_t P;
  M = (M>=ELEMENTS16) ? ELEMENTS16 : M;
  M = (M<1) ? 0 : (M-1);
  for (P=0; P<M; P++)
  {
    vacc = vqdmlsl_n_s16(vacc, vext_s16(vd0,vd1,P),
    vget_lane_s16(vc,P));
  }
  return vqdmlsl_n_s16(vacc, vext_s16(vd0,vd1,P), vget_lane_s16(vc,P));
}
```

11) Saturating and rounding repeating multiply-and-subtract with the initial accumulator set to zero.

```
vint32L_t vqrdmlsl_rz_s16(vint16_t vd0, vint16_t vd1, vint16_t vc,
uint_t M)
{
  uint_t P;
  vint32L_t vacc=vdup_n_s32L(0);
  M = (M>=ELEMENTS16) ? ELEMENTS16 : M;
  M = (M<1) ? 0 : (M-1);
  for (P=0; P<M; P++)
  {
    vacc = vqdmlsl_n_s16(vacc, vext_s16(vd0,vd1,P),
    vget_lane_s16(vc,P));
  }
  return vqrdmlsl_n_s16(vacc, vext_s16(vd0,vd1,p), vget_lane_s16(vc,P));
}
```

12) Saturating and rounding repeating multiply-and-subtract with the initial accumulator as an input vector.

```
vint32L_t vqrdmlsl_r_s16(vint32L_t vacc, vint16_t vd0, vint16_t vd1,
vint16_t vc, uint_t M)
{
  uint_t P;
  M = (M>=ELEMENTS16) ? ELEMENTS16 : M;
  M = (M<1) ? 0 : (M-1);
  for (P=0; P<M; P++)
  {
    vacc = vqdmlsl_n_s16(vacc, vext_s16(vd0,vd1,P),
    vget_lane_s16(vc,P));
  }
  return vqrdmlsl_n_s16(vacc, vext_s16(vd0,vd1,P), vget_lane_s16(vc,P));
}
```

13) Complex repeating MAC with the initial accumulator set to zero.

```
vint32L_t vmlal_rz_c16(vint16_t vd0, vint16_t vd1, vint16_t vc, uint_t M)
{
  uint_t P;
  vint32L_t vacc=vdup_n_s32L(0);
  M = (M>=ELEMENTC16) ? ELEMENTC16 : M;
  M = (M<1) ? 0 : (M-1);
  for (P=0; P<M; P++)
  {
    vacc = vmlal_n_c16(vacc, vext_c16(vd0,vd1,P), vget_lane_c16(vc,P));
  }
  return vmlal_n_c16(vacc, vext_c16(vd0,vd1,P), vget_lane_c16(vc,P));
}
```

14) Complex repeating MAC with the initial accumulator as an input vector.

```
vint32L_t vmlal_r_c16(vint32L_t vacc, vint16_t vd0, vint16_t vd1,
vint16_t vc, uint_t M)
{
  uint_t P;
  M = (M>=ELEMENTC16) ? ELEMENTC16 : M;
  M = (M<1) ? 0 : (M-1);
  for (P=0; P<M; P++)
  {
    vacc = vmlal_n_c16(vacc, vext_c16(vd0,vd1,P), vget_lane_c16(vc,P));
  }
  return vmlal_n_c16(vacc, vext_c16(vd0,vd1,P), vget_lane_c16(vc,P));
}
```

15) Complex conjugate repeating MAC with the initial accumulator set to zero.

```
vint32L_t vmlal_conj_rz_c16(vint16_t vd0, vint16_t vd1, vint16_t vc,
uint_t M)
{
  uint_t P;
  vint32L_t vacc=vdup_n_s32L(0);
  M = (M>=ELEMENTC16) ? ELEMENTC16 : M;
  M = (M<1) ? 0 : (M-1);
  for (P=0; P<M; P++)
  {
    vacc = vmlal_conj_n_c16(vacc, vext_c16(vd0,vd1,P),
  vget_lane_c16(vc,P));
  }
  return vmlal_conj_n_c16(vacc, vext_c16(vd0,vd1,P),
  vget_lane_c16(vc,P));
}
```

16) Complex conjugate repeating MAC with the initial accumulator as an input vector.

```
vint32L_t vmlal_conj_r_c16(vint32L_t vacc, vint16_t vd0, vint16_t
vd1,vint16_t vc, uint_t M)
{
  uint_t P;
  M = (M>=ELEMENTC16) ? ELEMENTC16 : M;
  M = (M<1) ? 0 : (M-1);
  for (P=0; P<M; P++)
  {
    vacc = vmlal_conj_n_c16(vacc, vext_c16(vd0,vd1,P),
  vget_lane_c16(vc,P));
  }
  return vmlal_conj_n_c16(vacc, vext_c16(vd0,vd1,P),
  vget_lane_c16(vc,P));
}
```

Considering example 1 above, the first line of this C code identifies the repeating MAC instruction, taking as inputs the input data element vectors vd0 and vd1 (together constituting the first vector of input data elements vd), the coefficient vector vc forming the vector of coefficient data elements, and the integer value M forming the scalar value indicating the number of iterations required. The operations performed in response to the instruction are then set out in the remainder of the C code. Firstly an integer variable P is initialised, whereafter a multiply-accumulate vector vacc is initialised to zero (this is performed by the second line of code vint32L_t vacc=vdup_n_s32L(0);). Whereas the individual data elements within the vectors vd0, vd1 and vc are 16 bits wide, the individual data elements within the vector vacc are 32 bits wide, in order to accommodate the multiplication result produced by multiplying a 16-bit input data element by a 16-bit coefficient data element.

Next, two checks on the scalar value M are performed. In particular, if M is greater than or equal to the parameter N (referred to in the C code as ELEMENTS16), then M is set equal to N, whereas otherwise the scalar value M is left unchanged. Secondly, if M is less than one, it is set equal to zero, whereas otherwise it is set equal to M−1.

A loop is then entered starting with P=0 and being repeated whilst P is less than M (P being incremented each time the loop is repeated). In each iteration, a multiply-accumulate operation is performed (identified as vmlal_n_s16). The coefficient data element used is determined using the get lane procedure, selecting the P-th coefficient data element from the vector vc with that single coefficient data element then being broadcast to a vector (i.e. to form N separate coefficient data elements that are all the same (this broadcasting functionality being indicated by the "n" in the vmlal_n_s16 operation)). As also shown, the N input data elements required as inputs to the MAC operation are selected from vd0 and vd1 dependent on the value of P using the shift operation vext_s16. Finally, the accumulate input is taken from the vector vacc.

Once the required number of iterations of the loop has been completed, a final vmlal_n_s16 operation is performed in order to return the results. This final iteration is required given than M was set equal to M−1 prior to the loop being entered.

Example 2 is similar to example 1, but here an initial multiply-accumulate vector vacc is specified by the instruction. The examples 3 to 12 illustrate saturating, and saturating and rounding, variants, along with the multiply-subtract versions of each.

Example 13 is similar to example 1, but data elements in vectors vacc, vc and vd are complex numbers and in each iteration a complex multiply-accumulate operation (identified as vmlal_n_c16) and the complex shift operation (identified as vext_c16) are performed. Example 15 is similar to example 13, but the coefficient data element is conjugated in order to invert the sign of the imaginary part of the coefficient data element prior to the multiply-accumulate operation being performed. Examples 14 and 16 are similar to examples 13 and 15, respectively, but in these examples an initial multiply-accumulate vector vacc is specified by the instruction. Whilst examples 13 to 16 represent complex number variants (in both non-conjugate and conjugate form) corresponding to the real number examples 1 and 2, it will be appreciated that complex number variants for all of the real number examples 1 to 12 can readily be provided.

FIG. 2 illustrates a data processing apparatus in accordance with one embodiment of the present invention, in this particular example the data processing apparatus taking the form of a digital signal processor (DSP) 100. Whilst the operations performed by the DSP 100 can take a variety of forms, in one embodiment the DSP may be used to perform wireless baseband processing functions. Wireless baseband places heavy demands upon the processing capabilities of such an integrated circuit. The data throughputs required are large and it is important to balance the different elements provided within the DSP in order that all of the elements are used with a high degree of efficiency. As shown in FIG. 2, the DSP includes a SIMD part 105 that includes a SIMD multiply-accumulate circuit 110 and various other SIMD processing circuits 120. Both the SIMD MAC circuit 110 and the other SIMD processing circuits 120 have access to a SIMD register bank 140 storing vectors of data elements required by the SIMD processing circuits. The SIMD MAC circuit 110 also has access to one or more SIMD accumulate registers 130 used to hold accumulate data elements generated during MAC operations.

In one example, the SIMD MAC circuit 110 and the other SIMD processing circuits 120 have 32 parallel lanes of processing, each 16 bits wide, which can be used to perform multiplication, addition and shuffle operations upon arithmetic values provided from the SIMD register bank. 16-bit data words are taken from respective elements within one or more input value registers within the SIMD register bank 140 in order to provide the required input values to each of the lanes of parallel processing.

Often the SIMD circuits will be pipelined, and in one embodiment the SIMD MAC circuit forms a 3 stage pipeline such that the results of a calculation will be available three cycles after the calculation is issued into the pipeline.

In one embodiment the respective processing lanes are controlled by a 256-bit very long instruction word (VLIW) instruction retrieved from program memory 165 by a controller 160. This VLIW instruction will also typically include a scalar instruction used to control scalar processing circuits 150 within a scalar part 145 of the DSP 100, the scalar processing circuits 150 having access to one or more scalar register banks 155. The controller 160 will include one or more instruction decoders which are used to decode instructions within the VLIW instruction, and to send required control signals to the circuits within the SIMD part 105 and the circuits within the scalar part 145. The controller will also send control signals as and when required to the load/store unit 170 to cause data to be retrieved from the data memory 175 for storing in either the SIMD register bank 140 or the scalar register bank 155, or for causing data to be stored back out to data memory 175 from those register banks.

The scalar processing circuits 150 operate in parallel with the above-mentioned SIMD processing circuits and serve primarily to perform control operations. One of the scalar processing circuits may also control an address generation unit responsible for generating memory access addresses used to access data values in the data memory 175. In one embodiment, the scalar processing circuits 150 have between 1 and 3 pipeline stages and the data memory 175 has 3-cycles or 6-cycles latency.

Considering the repeating MAC instruction of embodiments of the present invention, such an instruction may appear within the VLIW instruction retrieved by the controller 160 from the program memory 165, and upon decoding that repeating MAC instruction, control signals will be issued to the SIMD part 105, and in particular to the SIMD MAC circuit 110 to cause the SIMD MAC circuit 110 to perform a plurality of iterations of a multiply-accumulate process to thereby implement the sequence of operations illustrated schematically in FIG. 1A or 1B.

FIG. 3 is a diagram illustrating in more detail the components provided within the SIMD MAC circuit 110 to provide the required functionality. Registers 220 and 222 are provided for initially storing the vectors vd0 and vd1 that collectively form the first vector of input data elements vd, whilst the register 246 is used to store the second vector of coefficient data elements. Using the multiplexer 248, the 1:N converter 250 and the multiplexer 242, a single coefficient data element can be selected for each iteration, and broadcast across the N lanes in order to form a vector of coefficients stored in the register 240. During a first iteration of the multiply-accumulate process, this is achieved via the 1:N converter 244 which takes the first coefficient data element and broadcasts it across the N lanes, thereby avoiding the one cycle delay of using the register 246.

Whilst in the first iteration the register 220 contains the vector vd0 (i.e. the first N input data elements of the vector vd), for each subsequent iteration the contents of the register 220 are altered using the shift circuitry 226 which takes in one of the data elements from the register bank 222 (via the multiplexer 224) and the current contents of the register 220, and performs a shift by one data element in order to create the required input data elements for the next iteration, with that result then being routed back via the multiplexer 230 into the register 220.

As then shown in FIG. 3, the SIMD MAC circuit 110 has N lanes of parallel processing 260, with each lane including the components illustrated within the box 260 (the register 264 can be viewed as spanning all lanes), and with each lane operating on one of the N data elements in each of the input registers 220, 240. In particular, the multiplier circuitry 262 multiplies one of the input data elements in the register 220 by a coefficient data element from the register 240, with the result being stored in the register 264. In the next clock cycle, the accumulate operation is performed by the adder circuitry 268 using an accumulate value provided from the set to zero circuitry 272 and the multiply result from the register 264. Normally the control signal on line 217 will disable the set to zero functionality, and accordingly the accumulate result will be received from the SIMD accumulate register 130. However, optionally the repeating MAC instruction may specify a zero value initial accumulate value, and in that instance during the first iteration the control signal on line 217 will enable the set to zero functionality, thus ensuring that in the first cycle there is no accumulate value used.

Whilst the repeating MAC instruction will typically specify a multiplication add operation where the results of the multiplication in each iteration are added to the running accumulate result, it may alternatively specify a multiply subtract operation where the multiplication results in each iteration are subtracted from the running accumulate value. In the event that a multiplication subtract operation is defined, then a control signal on line 216 will cause the negate circuit 266 to negate the data elements in the register 264 prior to input to the adder 268.

Similarly, the repeating MAC instruction may specify whether the multiply-accumulate data elements produced are saturating or non-saturating. If they are non-saturating, typically the size of the input data elements and/or the size of the accumulate register 130 will be chosen so that there is no prospect of the accumulate result saturating. However, if the instruction specifies that the multiply-accumulate data elements are saturating, then the saturate circuitry 270 receives a control signal over path 219 to enable it to evaluate the output from the adder 268 prior to routing that output to the SIMD accumulate register 130. In particular, the saturate logic evaluates an overflow bit to determine whether the output multiply-accumulate data element is transitioning across a boundary from the maximum positive number to the minimum negative number, or vice versa, and if so to modify the result so that it is retained at the maximum positive number, or minimum negative number, respectively.

The control signal 218 is also provided to allow an optional rounding increment to be injected into the addition performed by the adder 268 during a final iteration, this being used if the repeating MAC instruction specifies that rounding is required. If rounding is required, it is important that the rounding is only performed in the final iteration so as to ensure that the correct mathematical result is produced, and accordingly the optional rounding increment value is only injected during the final iteration, this being controlled by the state machine 200 which will be discussed in more detail below.

The operation of the various circuit elements discussed above is controlled by a state machine 200, which receives a variety of control signals when each SIMD instruction to be executed by the SIMD MAC circuit 110 is decoded by the controller 160.

As shown in FIG. 3, the state machine receives three signals upon the decoding of an instruction. The first signal is a repeating indication issued over path 202, and if this signal is set it indicates that the instruction being decoded is a repeating MAC instruction, whereas if it is not set it indicates that the instruction being decoded is a standard MAC instruction. The signal received over path 204 is a repeats signal giving the number of iterations, this being provided from a scalar value stored in the scalar register bank 155, and not being used for a standard MAC instruction. The final signal received is the mult_cmd signal which is received over path 206, and provides standard multiplier command information, such as whether the multiply-accumulate is a multiply add or a multiply subtract, whether the accumulate value is saturating or non-saturating, whether rounding is required, whether an initial accumulate value is specified, or whether the accumulate should be cleared at the start of the operation, and any other relevant control signals.

In an alternative embodiment, the repeats signal can be derived from a scalar value forming one of the input operands of the repeating MAC instruction, in which case the repeats signal is provided from the controller 160 rather than the scalar register bank 155.

Figure 4:
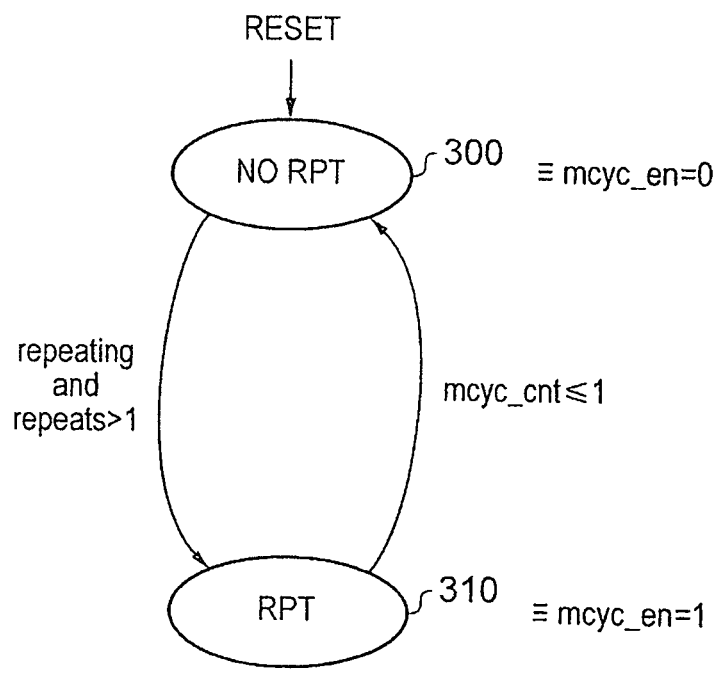
FIG. 4 is a state diagram illustrating the operation of the state machine shown in FIG. 3.

FIG. 4 shows the two basic states of the state machine. Following a reset, the state machine is in the no repeat state 300 and stays in the no repeat state until it receives the repeating signal on path 202 in a set state, and a repeats signal over path 204 which specifies a number of iterations. Under those conditions, the state of the state machine transitions from the no repeat state 300 to the repeat state 310. The state machine issues a number of control signals to the various components within the SIMD MAC circuitry 110, including a mcyc_en signal over path 212 which is set to a logic zero value whilst the state machine is in the no repeat state 300 and is set to a logic one value while the state machine is in the repeat state 310.

Whilst in the repeat state 310, the state machine maintains a counter called the mcyc_cnt signal, which is decremented from the initial repeats signal value M as each iteration is performed, and when the mcyc_cnt signal is less than or equal to one, the state machine transitions back from the repeat state 310 to the no repeat state 300.

Figure 5:
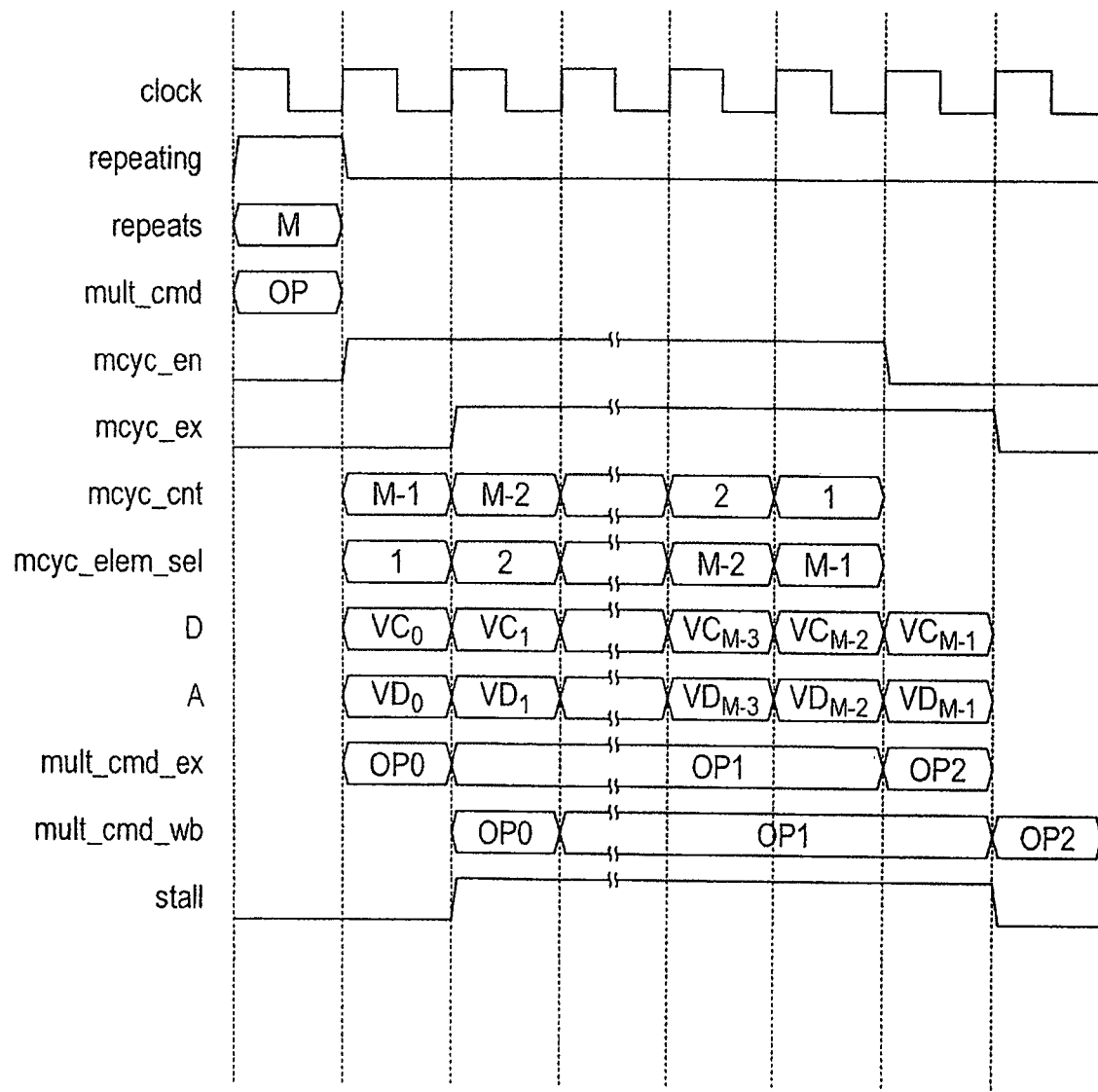
FIG. 5 is a timing diagram illustrating various signals generated in accordance with the embodiment of FIG. 3.

FIG. 5 is a timing diagram illustrating various signals produced by the state machine 200 in response to the three input signals it receives over path 202, 204 and 206 in situations where those signals identify the execution of a repeating MAC instruction.

Considering the multiplexer 230, the mcyc_en signal issued by the state machine 200 over path 212 is used to control the multiplexer, such that once the signal has been asserted, the multiplexer outputs to the register 220 the input it receives at its left hand side (from the shift circuitry 226). Accordingly, in the first cycle, prior to the assertion of the mcyc_en signal, the output from the SIMD register bank is routed via the multiplexer into the register 220, and as mentioned earlier this means that the vector register contents vd0 are placed in the register 220. In the following cycle, the multiplexer 230 will be primed by the asserted mcyc_en signal to select the left hand input, and as discussed earlier this left hand input will be generated by the shift circuitry 226 based on the contents of the register 220 and one of the data elements chosen from the register 222 under the control of the multiplexer 224. The multiplexer 224 receives the mcyc_elem_sel signal shown in FIG. 5, and selects the relevant data element from the register 222 in dependence on that signal. Accordingly, it will be seen with reference to FIG. 1A or 1B that the contents of register 220 for each iteration will be the input data elements shown schematically in FIG. 1A or 1B for each iteration.

Considering the multiplexer 242, then in the absence of a repeating MAC instruction, the left hand input of the multiplexer 242 will be propagated onto the register 240. In particular, the multiplexer 242 receives a two bit control signal formed by the mcyc_en signal output by the state machine over path 212 and the repeating signal received by the state machine over path 202. In the absence of a repeating MAC instruction, both bits will be cleared to a logic zero state. On occurrence of the repeating MAC instruction, the repeating signal will be set high during a first clock cycle, but the mcyc_en signal will not be output in a set state by the state machine 212 until the next clock cycle. Accordingly, during the first clock cycle, the input to the register 240 will be given by the middle input to the multiplexer 242, this being produced by the 1:N converter circuitry 244 using the first coefficient data element in the vector of coefficients vc, i.e. vc[0]. For each subsequent cycle during the repeating MAC instruction, the mcyc_en signal issued over path 212 will be set, and accordingly the input to the register 240 will be taken from the right hand input to the multiplexer 242, which as discussed earlier is generated from the contents in the register 246 (i.e. the second vector of coefficient data elements) under the control of the multiplexer 248. The multiplexer 248, like the multiplexer 224, receives the mcyc_elem_sel signal and accordingly steps through each of the coefficient data elements in turn. Considering the multiplexer 248, this selects coefficient data element i+1 if mcyc_elem_sel is i.

For completeness the outputs from register D 240 and register A 220 are illustrated in FIG. 5, where $VC_0$ indicates the vector of coefficients used in the first iteration, $VD_0$ indicates the vector of input data elements used in the first iteration, etc.

As shown in FIG. 3, the mult_cmd signal received over path 206 is latched in register 205, and is then subsequently routed onto the multiplexer 210 where it may be propagated onto the register 215 prior to the various command information then being propagated in the third clock cycle over the paths 216, 217, 218 and 219. The two registers 205, 215 are inserted merely to ensure the required three cycle delay in the propagation of the command information, so that that command information is passed to the accumulate circuitry in the correct cycle. As shown in FIG. 5, the state machine can also generate slightly modified versions of the mult_cmd signal for routing over path 208 to another input of the multiplexer 210, and then issues a control signal (mult_cmd_ex control signal) to the multiplexer to indicate whether the left hand input or the right hand input should be propagated onto the multiplexer 215 as a mult_cmd_ex signal. This control signal is set high whilst either mcyc_en or mcyc_ex (a pipelined version of mcyc_en shown in FIG. 5) is set high.

Hence, for a first iteration, as shown in FIG. 5 the received mult_cmd OP will be output over path 208 as OP0, and selected for output from multiplexer 210, OP0 being identical to OP other than in situations where OP specifies rounding, in which case OP0 will disable rounding to ensure no rounding increment is injected in the first iteration. For the next iteration right through until the final iteration, the state machine will issue over path 208 OP1, which will be the same as the original OP but with accumulate always enabled, and with the rounding always disabled, and OP1 will be propagated from multiplexer 210. As mentioned previously, the original OP may identify that the initial accumulate should be set to zero, but obviously this should only occur during the first iteration, and thereafter it is necessary to enable the accumulate. Rounding needs to remain disabled until the final cycle so as to ensure the correct mathematical rounding occurs. As also shown in FIG. 5, on the final iteration, the mult_cmd_ex signal will be set to OP2, which will be identical to the original OP but with the accumulate always enabled, and OP2 will be propagated on from the multiplexer 210. Accordingly, at this point, if the original OP specified rounding, OP2 will also specify rounding and will cause a rounding increment to be injected over path 218.

The mult_cmd_ex signal in FIG. 5 shows the output of multiplexer 210, which will result in the signal mult_cmd_wb being issued one cycle later from the register 215 to control the write back stage of the operation.

As also shown in FIG. 3, the mcyc_en signal issued over path 212 can optionally be latched in register 214, to produce the stall signal shown in FIG. 5. This can be used to cause the controller to suspend instruction fetching whilst the stall signal is asserted, thereby reducing power consumption.

Figure 6:
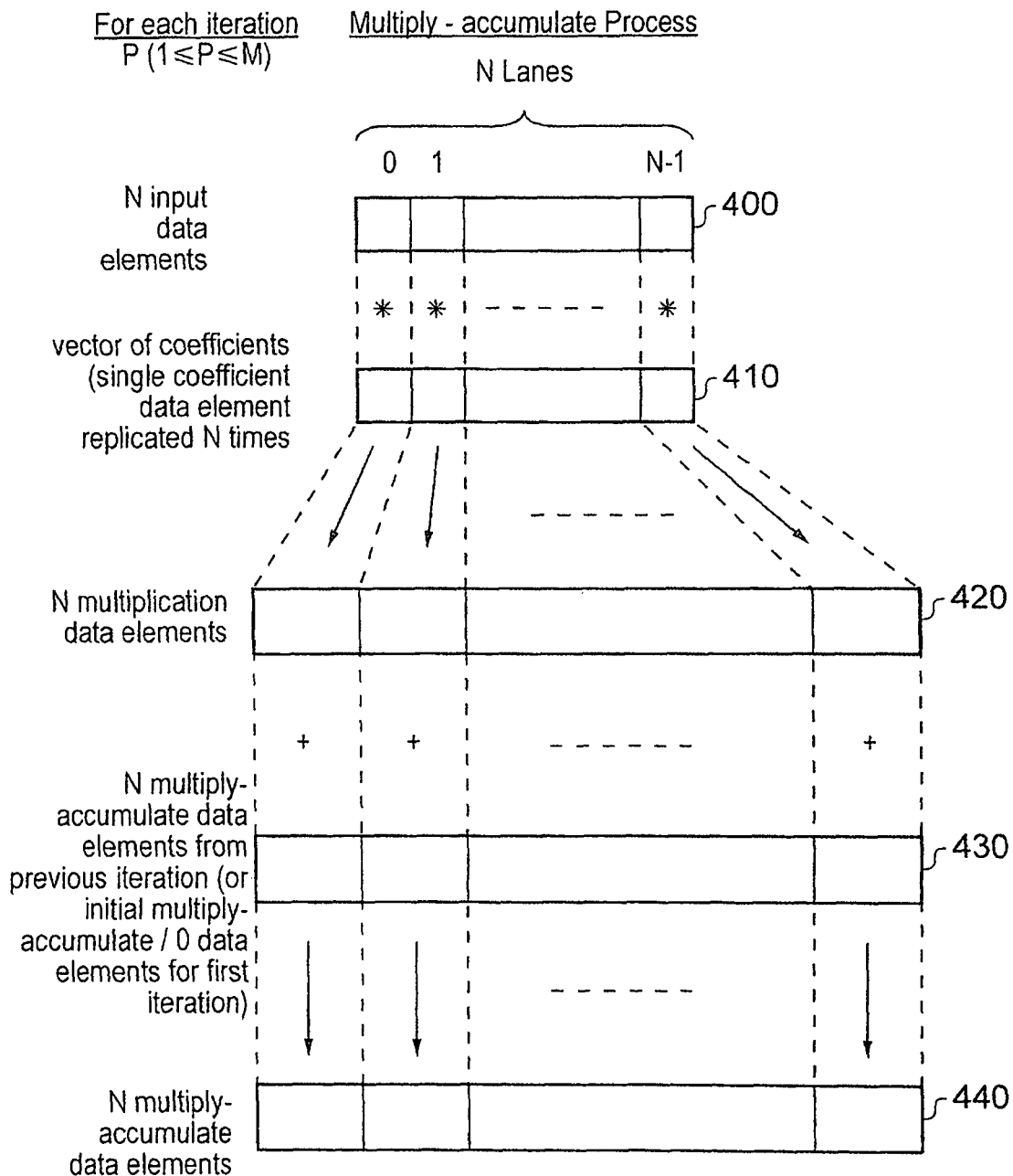
FIG. 6 schematically illustrates the multiply-accumulate process performed in each iteration in accordance with one embodiment of the present invention.

FIG. 6 schematically illustrates the multiply-accumulate operation performed by the SIMD MAC circuit 110 within the N lanes 260 in embodiments of the present invention. As shown in FIG. 6, the N lanes within the multiplier 262 receive N input data elements 400 and a vector of coefficients 410 formed by replicating a single coefficient data element N times, and based thereon performs the required multiplication resulting in the production of the N multiplication data elements 420 stored in the register 264. Assuming that each of the input data elements and coefficient data elements are 16 bits wide, then each of the multiplication data elements will be at least 32 bits wide.

Thereafter, the N multiplication data elements 420 are added (or optionally subtracted if the negate circuit 266 is activated) to the N multiply-accumulate data elements 430 input from the circuitry 272. Typically this will be the contents of the SIMD accumulate register 130, which will be the N multiply-accumulate data elements from a previous iteration, or will be a vector of initial multiply-accumulate data elements. Alternatively, for a first iteration, the N multiply-accumulate data elements may all be set to zero. The result of the addition is the generation of N multiply-accumulate data elements 440, which are stored back to the SIMD accumulate register 130.

Figure 7:
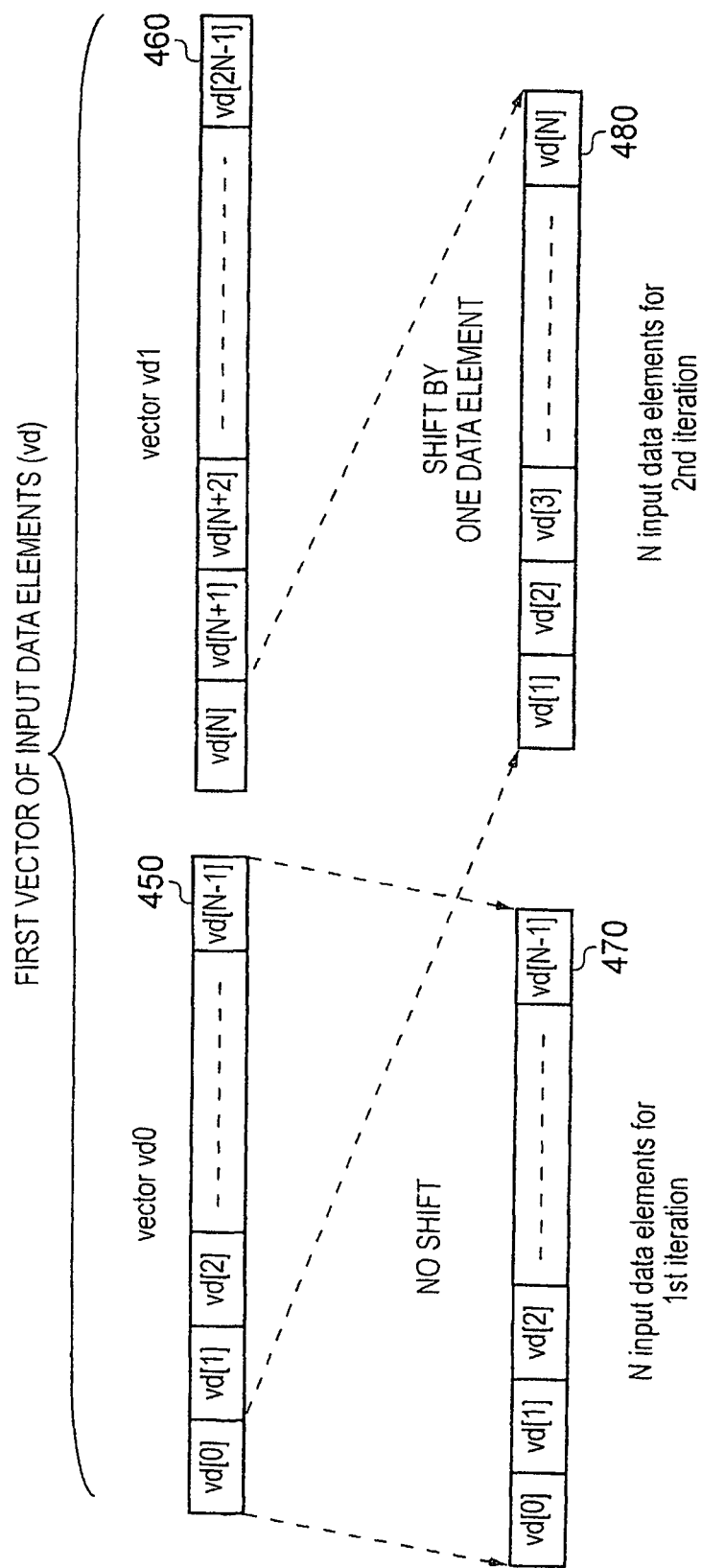
FIG. 7 schematically illustrates how the N input data elements for various iterations are derived from the first vector of input data elements in accordance with one embodiment of the present invention.

FIG. 7 schematically illustrates how the circuit elements 220, 222, 224 and 226 in FIG. 3 are arranged to generate the N input data elements for each iteration from the original first vector of input data elements vd. In particular, initially the vector vd0 450 is stored in the register 220 and the vector vd1 460 is stored in register 222. On the first iteration, the contents in the register 220 are unchanged, and accordingly the N input data elements 470 are routed to the multiplier 262. In the next iteration, the shift circuitry 226 receives the current contents of the register 220, i.e. the vector vd0 450, and also receives the first data element from the vector vd1 stored in the register 222, i.e. vd[N], and performs a right shift operation by one data element such the resultant N input data elements 480 are produced and returned via the multiplexer 230 into the register 220. Each subsequent iteration proceeds in a similar manner so as to produce the series of N input data element vectors shown in FIG. 1A or 1B.

Figure 8:
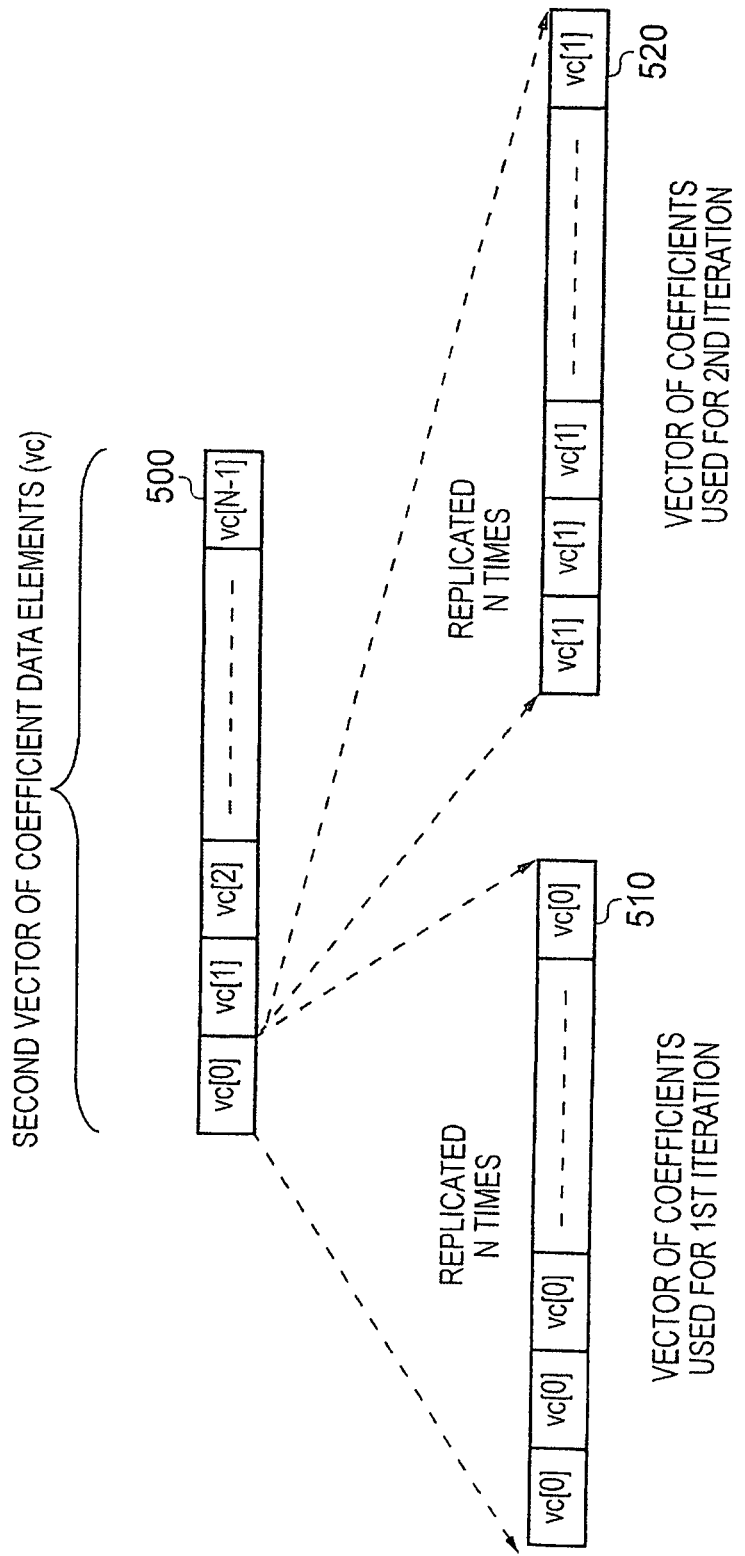
FIG. 8 schematically illustrates how the vector of coefficients used for each iteration are derived from the second vector of coefficient data elements in accordance with one embodiment of the present invention.

FIG. 8 schematically illustrates how the vector of coefficients used for each iteration are derived from the second vector of coefficient data elements vc stored in the register 246. On the first iteration, the first coefficient data element vc[0] is selected and then replicated N times to form the vector of coefficients 510. As discussed earlier, in one embodiment this is actually achieved using the 1:N conversion circuitry 244 rather than using the contents of the register 246, so as to avoid a one cycle propagation delay. In the next cycle, the second coefficient data element vc[1] is selected and replicated N times to form the vector of coefficients 520 input from the 1:N converter 250 via the multiplexer 242 into the register 240. For each subsequent iteration, the next coefficient data element is selected and manipulated in the same way, so as to produce the series of coefficient vectors shown in FIG. 1A or 1B.

In the above described embodiment, repeating MAC instructions process real numbers. However, as discussed earlier, in an alternative embodiment, repeating MAC instructions may be arranged to process complex numbers, where all data elements (in the first vector of input data, the second vector of coefficients and the N multiply-accumulate results) are complex numbers and all operations are complex operations. Considering the example of FIG. 3, this can be achieved by arranging the multiplier circuitry 262 as a complex multiplier which can be arranged to perform the four multiplications of the real and imaginary parts discussed earlier on page 17, along with the required addition and subtraction in order to produce a multiplication result having real and imaginary parts. The adder 268 can then be arranged as a complex adder to perform the required accumulate operation with respect to the real and imaginary parts in order to produce an updated complex accumulate value. If a multiply-subtract operation is being performed the negate circuit 266 will negate the complex multiplication result produced by the multiplication circuit 262 prior to input to the adder 268.

In the event that a complex conjugate repeating MAC instruction is being processed, an additional control signal can be provided to the multiplication circuit 262 to cause it to invert the sign of the imaginary part of the coefficient data element before performing the required multiplication operations.

As an alternative to handling complex numbers in the above manner, complex number FIR filters can also be synthesized using four non-complex repeating MAC instructions, as schematically illustrated in FIG. 9. In particular, in the upper part of FIG. 9 the equations required to produce the real and imaginary components of the multiply-accumulate results are shown ("R" denoting a real component, and "I" denoting an imaginary component). In the lower half of FIG. 9, the sequence of four instructions required to generate those results is shown, with the input operands for each instruction being identified in square brackets. Hence, the first repeat MAC instruction performs a multiply add, using vdR and vcR as input vectors, and with an initial accumulate value of zero. For all of the four instructions the scalar value is set to the same value M. The second repeating MAC instruction then completes the generation of the vaccR results using as input vectors vdI and vcI and setting as the initial accumulate result the accumulate result produced by the first repeating MAC instruction. It should be noted that the second repeating MAC instruction is of the subtract variety, and accordingly performs a multiply subtract operation. The third and fourth repeating MAC instructions then generate the vaccI results in a similar way, but this time the second of the two repeating MAC instructions (repeating MAC 4) is again an add variant.

Whilst in the above described embodiments of the present invention, each repeating MAC instruction receives a first vector of input data elements, and a second vector of coefficient data elements, and generates one set of N multiply-accumulate results, in an alternative embodiment one repeating MAC instruction can be arranged to generate two or more sets of N multiply-accumulate results, where either the input operands or the coefficient data elements are re-used between the two or more multiply-accumulate processes performed. Such an embodiment will be described with reference to the block diagram of FIG. 10 and timing diagram of FIG. 11.

Figure 10:
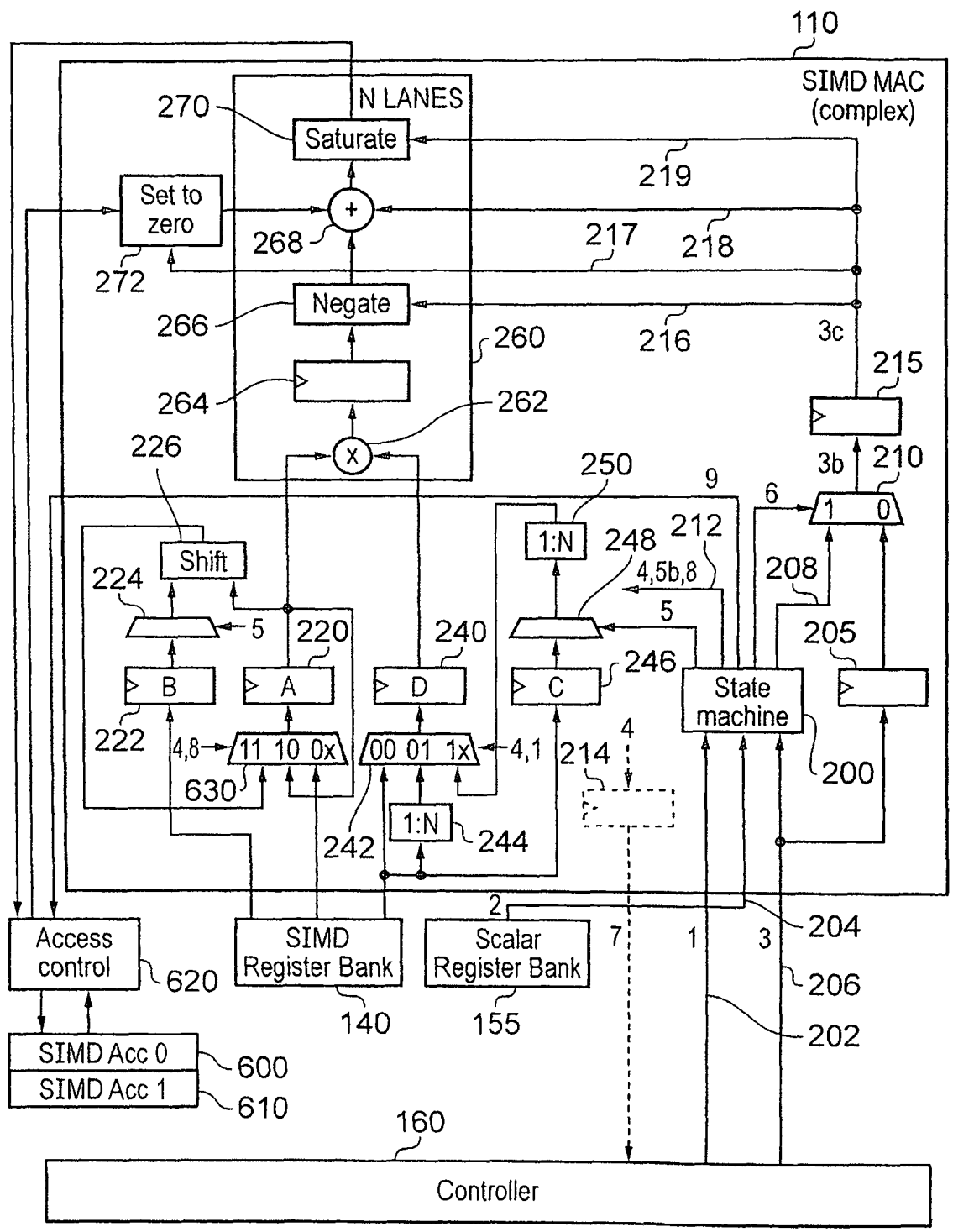
FIG. 10 illustrates an alternative embodiment of the present invention to that shown in FIG. 3, where the SIMD MAC circuit can perform two separate multiply-accumulate stages in parallel in response to a single repeating MAC instruction.

The apparatus used in FIG. 10 is used to enable the SIMD MAC circuit 110 to perform in parallel two multiply-accumulate stages, so as to produce two separate sets of N multiply-accumulate results, all in response to a single repeating MAC instruction decoded by the controller 160. As is apparent from a comparison of FIG. 10 with the earlier-described FIG. 3, the circuitry is basically the same, subject to a few modifications. Firstly, two SIMD accumulate registers 600, 610 are provided instead of the single SIMD accumulate register 130, and some associated access control circuitry 620 is provided which is controlled by a control signal issued by the state machine 200, as will be discussed in more detail below. Further, the multiplexer 230 used in FIG. 3 to determine the input to the register 220 is now replaced by a three input multiplexer 630 controlled by a two bit signal derived from control signals output by the state machine 200. The only other point of note is that whilst in FIG. 3 the multiplexers 224 and 248 were both controlled by the same control signal from the state machine, they are now controlled by two different signals, as will be discussed in more detail with reference to the timing diagram of FIG. 11.

Figure 11:
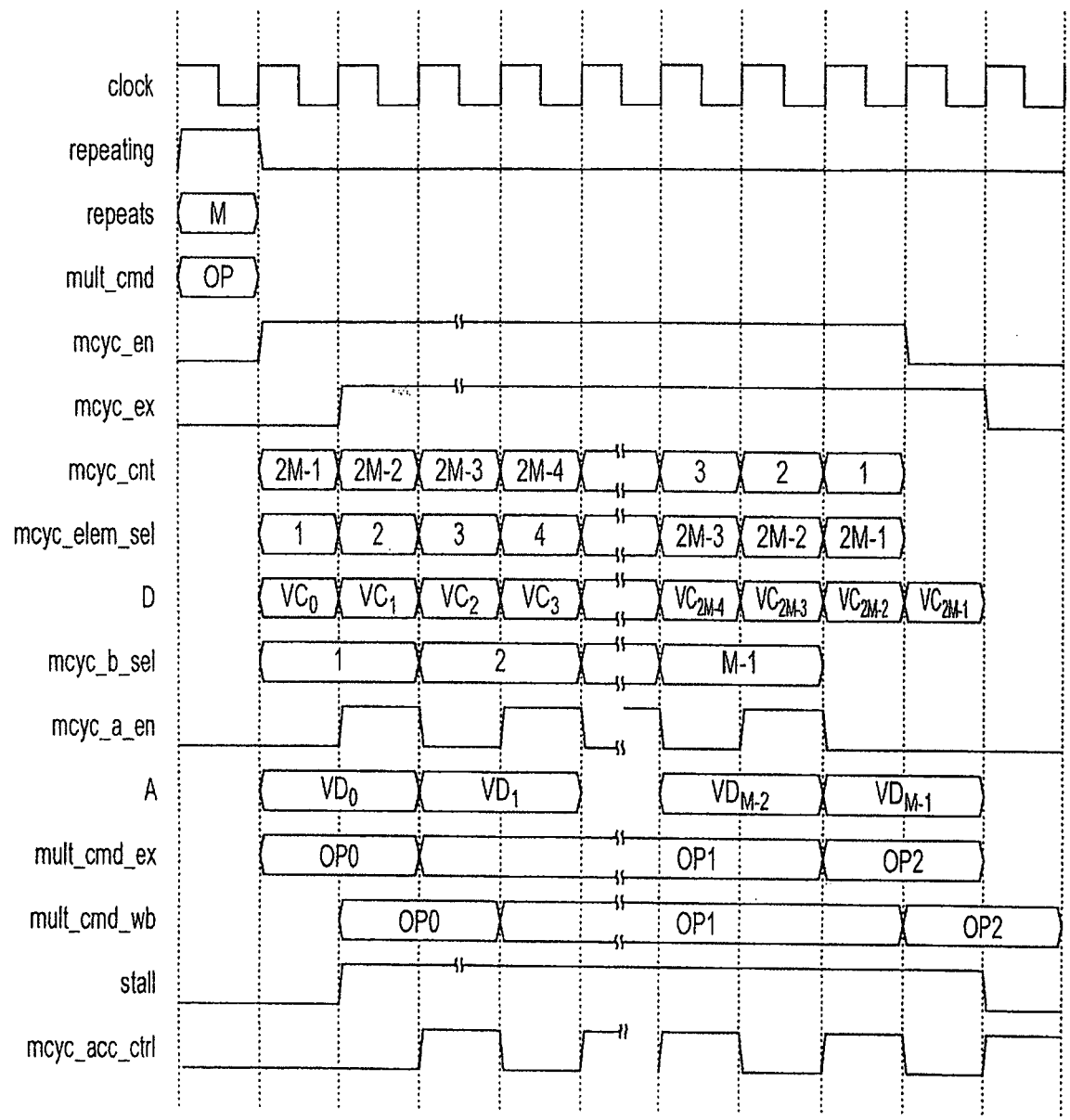
FIG. 11 is a timing diagram for the circuit of FIG. 10.

As is apparent from a comparison of the timing diagram of FIG. 11 with the timing diagram of FIG. 5, FIG. 11 is similar to FIG. 5, but additionally shows the extra control signals used within the circuitry of FIG. 10. As shown in FIG. 10, the multiplexer 248 is controlled by the mcyc_c_sel signal, which as shown in FIG. 11 is incremented during each iteration. Whilst the number of iterations specified is M, mcyc_count decrements from 2M−1, given that there are two separate multiply-accumulate stages being implemented. As a result of the mcyc_c_sel signal incrementing during each iteration, it can be seen that the vector of coefficients output from the register D 240 during each iteration changes.

In contrast, the multiplexer 224 is controlled by the mcyc_b_sel signal, which as is clear from FIG. 11 is only incremented every second iteration. As shown in FIG. 10, the output from the register A 220 is routed back as the middle input to the multiplexer 630. When the mcyc_en signal is set, the multiplexer 630 will output to the register 220 either its middle input or its left hand input, dependent on the value of the mcyc_a_en signal output by the state machine 200 over path 212. As shown in FIG. 11, this signal alternates between a set and a clear state each iteration, thereby ensuring that the output from the register 220 is maintained the same for two iterations, since its contents can only be updated once very two iterations in response to the mcyc_a_en signal going high.

The mcyc_acc_ctrl signal received by the access control circuitry 620 from the state machine 200 also oscillates every clock cycle once the initial three cycles required by the first iteration have completed. Whilst this signal is at a logic zero level, the SIMD accumulate register 600 is accessed, and whilst it is at a logic one level the SIMD accumulate register 610 is accessed. This ensures that the accumulate data elements maintained for each of the separate multiply-accumulate stages are retained separately within the separate SIMD accumulate registers 600, 610.

As is apparent from the above description of FIGS. 10 and 11, in this embodiment, the vectors of input data elements chosen for each iteration are re-used for both multiply-accumulate stages. However, the coefficient data elements are not re-used, and instead different vectors of coefficient data elements are used for each of the multiply-accumulate stages, the first multiply-accumulate stage using the vectors $VC_0$, $VC_2$, $VC_4$, etc and the second multiply-accumulate stage using the vectors $VC_1$, $VC_3$, $VC_5$, etc. Accordingly, it can be seen that in this embodiment the second vector of coefficient data elements as provided from one of the registers in the SIMD register bank contains individual coefficient data elements that are packed such that each alternate coefficient data element relates to the same multiply-accumulate stage. In this embodiment, the scalar value M is restricted to be less than or equal to N/2, so that the N coefficient data elements stored in the register 246 are sufficient to provide the 2M separate sets of vectors of coefficient data elements shown in FIG. 11. However, in an alternative embodiment, the circuitry of FIG. 10 could be modified so that the contents of two SIMD registers could be used to provide the second vector of coefficient data elements, thereby allowing the scalar value M to be any value less than or equal to N.

The provision of a single repeating MAC instruction that enables two separate multiply-accumulate stages to be performed in parallel within the SIMD MAC circuit 110 can be useful in a variety of situations. In one embodiment, such an instruction is used to reduce energy consumption when performing the various multiply-accumulate stages required when performing FIR filter operations on complex numbers. For example, considering FIG. 9, one instruction can be used to perform both the stages $vacc_R = vacc_R + vd_R \cdot vc_R$ and $vacc_I = vacc_I + vd_R \cdot vc_I$. In particular, it is clear that the $vd_R$ components can be shared between both stages, but with different vectors of coefficient data elements being selected using the mechanism described earlier with reference to FIGS. 10 and 11. Hence, in effect, the functionality that could be performed by the two repeating MAC instructions "repeating MAC 1" and "repeating MAC 3" shown in FIG. 9 can be subsumed into a single repeating MAC instruction. Similarly, the functionalities performed by the two repeating MAC instructions "repeating MAC 2" and "repeating MAC 4" could also be subsumed into a single repeating MAC instruction, although in this case the negate circuitry 266 would need to be alternately enabled and disabled between each iteration so that in one accumulate register the results of a multiply subtract procedure are retained whilst in the other accumulate register the results of a multiply add procedure are retained.

In all of the above embodiments, it will be appreciated that if the scalar value is restricted to be less than or equal to N, it is still possible to perform computations where more than N iterations are required by using multiple repeating MAC instructions one after the other, with a subsequent repeating MAC instruction taking as its initial multiply-accumulate data elements the N multiply-accumulate results generated by the preceding repeating MAC instruction.

Whilst the above described techniques may be performed by hardware executing a sequence of native instructions which include the above-mentioned repeating MAC instructions, it will be appreciated that in alternative embodiments, such instructions may be executed in a virtual machine environment, where the instructions are native to the virtual machine, but the virtual machine is implemented by software executing on hardware having a different native instruction set. The virtual machine environment may provide a full virtual machine environment emulating execution of a full instruction set or may be partial, e.g. only some instructions, including the instructions of the present technique, are trapped by the hardware and emulated by the partial virtual machine.

More specifically, the above-described repeating MAC instructions may be executed as native instructions to the full or partial virtual machine, with the virtual machine together with its underlying hardware platform operating in combination to provide the SIMD processing circuitry described above.

Figure 12:
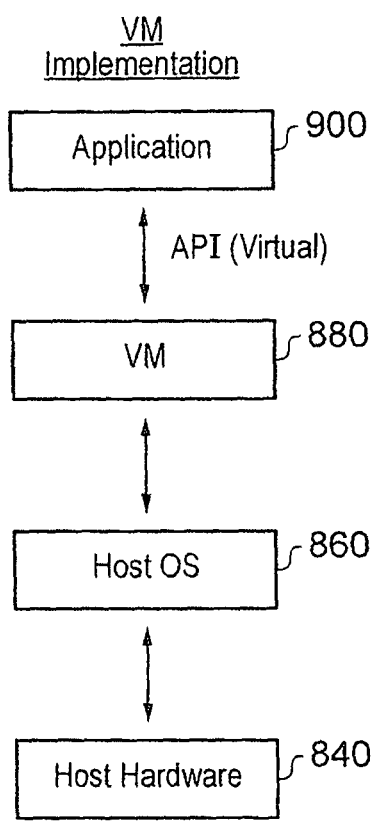
FIG. 12 is a diagram schematically illustrating a virtual machine implementation for executing program code utilising the repeating MAC instruction of embodiments of the present invention.

FIG. 12 illustrates such a virtual machine implementation that may be used. Whilst the earlier described embodiments implement the present invention in terms of apparatus and methods for operating specific processing hardware supporting the instructions concerned, it is also possible to provide so-called virtual machine implementations of hardware devices. These virtual machine implementations run on a host processor 840 running a host operating system 860 supporting a virtual machine program 880. Typically large powerful processors are required to provide virtual machine implementations which execute at a reasonable speed, but such an approach may be justified in certain circumstances, such as when there is a desire to run code native to another processor for compatibility or re-use reasons. The virtual machine program 880 provides an application program interface to an application program 900 which is the same as the application program interface which would be provided by the real hardware which is the device being modelled by the virtual machine program 880. Thus, the program instructions, including the repeating MAC instruction described above, may be executed from within the application program 900 using the virtual machine program 880 to model their interaction with the virtual machine hardware.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
SIMD data processing circuitry, responsive to control signals, configured to perform data processing operations in parallel on multiple data elements;
A SIMD register bank configured to store the data elements for access by the SIMD data processing circuitry;
instruction decoder circuitry, coupled to said SIMD data processing circuitry and responsive to program instructions, configured to generate said control signals;
said instruction decoder circuitry, responsive to a repeating multiply-accumulate (repeating MAC) instruction having as input operands a first vector of input data elements, a second vector of coefficient data elements, and a scalar value indicative of a plurality of iterations M required, configured to generate corresponding control signals to control said SIMD data processing circuitry, said vectors stored in said SIMD register bank;
said SIMD data processing circuitry, responsive to said corresponding control signals, configured to perform said plurality of iterations of a multiply-accumulate process, each iteration of the multiply-accumulate process comprising performing N multiply-accumulate operations in parallel in order to produce N multiply-accumulate data elements;

for each iteration, said SIMD data processing circuitry, responsive to said corresponding control signals, configured to determine N input data elements from said first vector and a single coefficient data element from said second vector to be multiplied with each of the N input data elements during the N multiply-accumulate operations; and said SIMD data processing circuitry, responsive to said corresponding control signals, configured to output N multiply-accumulate results derived from the N multiply-accumulate data elements produced in a final iteration of the multiply-accumulate process;

said SIMD data processing circuitry configured to access said first and second vectors from registers of the SIMD register bank prior to performing said plurality of iterations of the multiply-accumulate process, whereby no further access to the SIMD register bank is required in respect of the first and second vectors during performance of said plurality of iterations of the multiply-accumulate process; and the SIMD data processing circuitry including a state machine for generating further control signals used to control circuitry within the SIMD data processing circuitry to select the N input data elements and the single coefficient data element for each iteration.

2. A data processing apparatus as claimed in claim 1, wherein the repeating MAC instruction is used to perform an FIR filter operation, and the N multiply-accumulate results produced form N FIR results.

3. A data processing apparatus as claimed in claim 1, wherein the number of input data elements in the first vector is at least N+M−1, and the state machine determines the N input data elements for iteration P by causing shift circuitry to perform a shift operation with respect to the N data elements used for iteration P−1.

4. A data processing apparatus as claimed in claim 1, wherein the state machine determines a different coefficient data element from said second vector for each iteration.

5. A data processing apparatus as claimed in claim 1, wherein the repeating MAC instruction also has as an input operand a vector of initial multiply-accumulate data elements and the N multiply-accumulate data elements are set to said initial multiply-accumulate data elements prior to the first iteration of the multiply-accumulate process.

6. A data processing apparatus as claimed in claim 1, wherein the N multiply-accumulate data elements are set to zero prior to the first iteration of the multiply-accumulate process.

7. A data processing apparatus as claimed in claim 1, wherein the state machine determines the number of iterations M from the scalar value, and asserts a stall signal to one or more components of the data processing apparatus whilst at least one of the plurality of iterations are being performed.

8. A data processing apparatus as claimed in claim 7, wherein the stall signal is asserted during all but one iteration of the plurality of iterations.

9. A data processing apparatus as claimed in claim 1, wherein the first vector of input data elements has a number of input data elements which is a multiple of N, and the SIMD data processing circuitry accesses said input data elements by accessing multiple registers of the SIMD register bank, each of said multiple registers containing N input data elements.

10. A data processing apparatus as claimed in claim 1, further comprising a multiply-accumulate register for storing N multiply-accumulate data elements.

11. A data processing apparatus as claimed in claim 10, wherein each of the input data elements comprise X bits, each of the coefficient data elements comprise Y bits, and each multiply-accumulate data element stored in the multiply-accumulate register is at least X+Y bits in size.

12. A data processing apparatus as claimed in claim 11, wherein the multiply-accumulate register stores the multiply-accumulate data elements in extended form, the extended form including additional bits used for determining an overflow.

13. A data processing apparatus as claimed in claim 1, wherein:
at least one of the input data elements and the coefficient data elements are complex numbers that comprise real and imaginary parts;
each iteration of the multiply-accumulate process comprises performing N complex multiply-accumulate operations in parallel in order to produce N complex multiply-accumulate data elements; and
the N multiply-accumulate results output are complex numbers.

14. A data processing apparatus as claimed in claim 13, wherein both the input data elements and the coefficient data elements are complex numbers that comprise real and imaginary parts.

15. A data processing apparatus as claimed in claim 13, wherein each complex multiply-accumulate operation involves performance of a sequence of multiply, add and subtract operations in order to produce real and imaginary parts of the corresponding complex multiply-accumulate data element.

16. A data processing apparatus as claimed in claim 13, wherein the coefficient data elements are complex numbers, and in each iteration the complex coefficient data element is conjugated before the N complex multiply-accumulate operations are performed.

17. A data processing apparatus as claimed in claim 1, wherein the multiply-accumulate operations are multiply-subtract operations.

18. A data processing apparatus as claimed in claim 1, wherein one of the control signals produced by the instruction decoder circuitry specifies whether rounding is required, and if rounding is required the state machine is arranged to cause a rounding increment to be injected into each multiply-accumulate operation performed in one of said plurality of iterations.

19. A data processing apparatus as claimed in claim 1, wherein one of the control signals produced by the instruction decoder circuitry specifies whether the multiply-accumulate data elements to be produced are saturating or non-saturating, and accumulate circuitry within the SIMD data processing circuitry is configured dependent on said control signal.

20. A data processing apparatus as claimed in claim 1, wherein said scalar value is less than or equal to N.

21. A data processing apparatus as claimed in claim 20, wherein if N+Q iterations are required, where Q is less than or equal to N, then a first repeating MAC instruction has a scalar value indicating N iterations, and is followed by a further repeating MAC instruction having a scalar value indicating Q iterations and identifying as a vector of initial multiply-accumulate data elements the N multiply-accumulate results generated by the SIMD data processing circuitry in response to the first repeating MAC instruction.

22. A data processing apparatus as claimed in claim 1, wherein if said scalar value as specified by the repeating MAC instruction is larger than a maximum number of iterations that can be performed, then the scalar value is set equal to said maximum number and said SIMD data processing circuitry performs said maximum number of iterations of said multiply-accumulate process.

23. A data processing apparatus as claimed in claim 1, wherein the instruction decoder circuitry is responsive to a sequence of repeating MAC instructions to generate control signals to control said SIMD data processing circuitry to perform a sequence of multiply-accumulate stages, each multiply-accumulate stage performing said plurality of iterations of said multiply-accumulate process, and at least one multiply-accumulate stage using as an input the N multiply-accumulate results generated by a previous multiply-accumulate stage.

24. A data processing apparatus as claimed in claim 1, wherein the instruction decoder circuitry is responsive to a single repeating MAC instruction to generate control signals to control said SIMD data processing circuitry to perform at least two multiply-accumulate stages, each multiply-accumulate stage performing said plurality of iterations of said multiply-accumulate process, with the input data elements and the coefficient data elements required for each multiply-accumulate stage being determined from the first and second vectors.

25. A data processing apparatus as claimed in claim 23, wherein the multiple multiply-accumulate stages are used to perform repeated MAC operations on complex numbers.

26. A method of processing data using SIMD data processing circuitry responsive to control signals to perform data processing operations in parallel on multiple data elements and instruction decoder circuitry coupled to said SIMD data processing circuitry and responsive to program instructions to generate said control signals, said method comprising the steps of:
   decoding a repeating multiply-accumulate (repeating MAC) instruction having as input operands a first vector of input data elements, a second vector of coefficient data elements, and a scalar value indicative of a plurality of iterations M required, to generate corresponding control signals, said vectors stored in a SIMD register bank;
   controlling said SIMD data processing circuitry with said corresponding control signals to produce multiply-accumulate results by the steps of:
   performing said plurality of iterations of a multiply-accumulate process, each iteration of the multiply-accumulate process comprising performing N multiply-accumulate operations in parallel in order to produce N multiply-accumulate data elements;
   for each iteration, determining N input data elements from said first vector and a single coefficient data element from said second vector to be multiplied with each of the N input data elements during the N multiply-accumulate operations; and
   outputting N multiply-accumulate results derived from the N multiply-accumulate data elements produced in a final iteration of the multiply-accumulate process;
   causing said SIMD data processing circuitry to access said first and second vectors from registers of the SIMD register bank prior to performing said plurality of iterations of the multiply-accumulate process, whereby no further access to the SIMD register bank is required in respect of the first and second vectors during performance of said plurality of iterations of the multiply-accumulate process; and
   employing a state machine within the SIMD data processing circuitry to generate further control signals used to control circuitry within the SIMD data processing circuitry to select the N input data elements and the single coefficient data element for each iteration.

27. A data processing apparatus comprising:
   SIMD data processing means for performing data processing operations in parallel on multiple data elements in response to control signals;
   SIMD register bank means for storing the data elements for access by the SIMD data processing means;
   instruction decoder means, coupled to said SIMD data processing means, for generating said control signals in response to program instructions;
   wherein said instruction decoder means, in response to a repeating multiply-accumulate (repeating MAC) instruction having as input operands a first vector of input data elements, a second vector of coefficient data elements, and a scalar value indicative of a plurality of iterations M required, said vectors stored in said SIMD register bank means, generates corresponding control signals to control said SIMD data processing means;
   said SIMD data processing means, responsive to said corresponding control signals, for performing said plurality of iterations of a multiply-accumulate process, each iteration of the multiply-accumulate process comprising performing N multiply-accumulate operations in parallel in order to produce N multiply-accumulate data elements;
   for each iteration, said SIMD data processing means, responsive to said corresponding control signals, for determining N input data elements from said first vector and a single coefficient data element from said second vector to be multiplied with each of the N input data elements during the N multiply-accumulate operations; and
   said SIMD data processing means, responsive to said corresponding control signals, for outputting N multiply-accumulate results derived from the N multiply-accumulate data elements produced in a final iteration of the multiply-accumulate process;
   the SIMD data processing means for accessing said first and second vectors from registers of the SIMD register bank means prior to performing said plurality of iterations of the multiply-accumulate process, whereby no further access to the SIMD register bank means is required in respect of the first and second vectors during performance of said plurality of iterations of the multiply-accumulate process; and
   the SIMD data processing means having a state machine for generating further control signals used to control circuitry within the SIMD data processing means to select the N input data elements and the single coefficient data element for each iteration.

28. A data processing apparatus as claimed in claim 1, wherein the SIMD data processing circuitry further comprises shift circuitry for performing a shift operation in response to the control signals from the state machine in order to produce for each iteration the N input data elements from said first vector.

29. A data processing apparatus as claimed in claim 1, wherein the SIMD data processing circuitry further comprises 1:N converter circuitry for replicating N times the single coefficient data element determined for each iteration, in order to enable that single coefficient data element to be used in each of the N multiply-accumulate operations performed in parallel during that iteration.

30. A data processing apparatus comprising:

SIMD data processing circuitry responsive to control signals to perform data processing operations in parallel on multiple data elements;

instruction decoder circuitry coupled to said SIMD data processing circuitry and responsive to program instructions to generate said control signals;

said instruction decoder circuitry being responsive to a repeating multiply-accumulate (repeating MAC) instruction having as input operands a first vector of input data elements, a second vector of coefficient data elements, and a scalar value indicative of a plurality of iterations M required, to generate control signals to control said SIMD data processing circuitry:

to perform said plurality of iterations of a multiply-accumulate process, each iteration of the multiply-accumulate process comprising performing N multiply-accumulate operations in parallel in order to produce N multiply-accumulate data elements;

for each iteration, to determine N input data elements from said first vector and a single coefficient data element from said second vector to be multiplied with each of the N input data elements during the N multiply-accumulate operations; and to output N multiply-accumulate results derived from the N multiply-accumulate data elements produced in a final iteration of the multiply-accumulate process, wherein the SIMD data processing circuitry has a state machine for determining the N input data elements and the single coefficient data element for each iteration, wherein the state machine determines the number of iterations M from the scalar value, and asserts a stall signal to one or more components of the data processing apparatus whilst at least one of the plurality of iterations are being performed, wherein the stall signal is asserted during all but one iteration of the plurality of iterations.

31. A data processing apparatus comprising:

SIMD data processing circuitry responsive to control signals to perform data processing operations in parallel on multiple data elements;

instruction decoder circuitry coupled to said SIMD data processing circuitry and responsive to program instructions to generate said control signals;

said instruction decoder circuitry being responsive to a repeating multiply-accumulate (repeating MAC) instruction having as input operands a first vector of input data elements, a second vector of coefficient data elements, and a scalar value indicative of a plurality of iterations M required, to generate control signals to control said SIMD data processing circuitry:

to perform said plurality of iterations of a multiply-accumulate process, each iteration of the multiply-accumulate process comprising performing N multiply-accumulate operations in parallel in order to produce N multiply-accumulate data elements;

for each iteration, to determine N input data elements from said first vector and a single coefficient data element from said second vector to be multiplied with each of the N input data elements during the N multiply-accumulate operations; and to output N multiply-accumulate results derived from the N multiply-accumulate data elements produced in a final iteration of the multiply-accumulate process, wherein said scalar value is less than or equal to N, wherein if N+Q iterations are required, where Q is less than or equal to N, then a first repeating MAC instruction has a scalar value indicating N iterations, and is followed by a further repeating MAC instruction having a scalar value indicating Q iterations and identifying as a vector of initial multiply-accumulate data elements the N multiply-accumulate results generated by the SIMD data processing circuitry in response to the first repeating MAC instruction.

32. A data processing apparatus comprising:

SIMD data processing circuitry responsive to control signals to perform data processing operations in parallel on multiple data elements;

instruction decoder circuitry coupled to said SIMD data processing circuitry and responsive to program instructions to generate said control signals;

said instruction decoder circuitry being responsive to a repeating multiply-accumulate (repeating MAC) instruction having as input operands a first vector of input data elements, a second vector of coefficient data elements, and a scalar value indicative of a plurality of iterations M required, to generate control signals to control said SIMD data processing circuitry:

to perform said plurality of iterations of a multiply-accumulate process, each iteration of the multiply-accumulate process comprising performing N multiply-accumulate operations in parallel in order to produce N multiply-accumulate data elements;

for each iteration, to determine N input data elements from said first vector and a single coefficient data element from said second vector to be multiplied with each of the N input data elements during the N multiply-accumulate operations; and to output N multiply-accumulate results derived from the N multiply-accumulate data elements produced in a final iteration of the multiply-accumulate process, wherein if said scalar value as specified by the repeating MAC instruction is larger than a maximum number of iterations that can be performed, then the scalar value is set equal to said maximum number and said SIMD data processing circuitry performs said maximum number of iterations of said multiply-accumulate process.

\* \* \* \* \*